Jan. 19, 1965 W. R. MILLER ETAL 3,165,814
BURNISHING LATHE FOR AXLES
Filed May 4, 1960 20 Sheets-Sheet 1
Fig. 1.
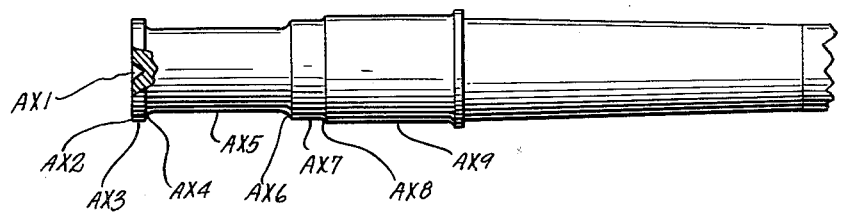
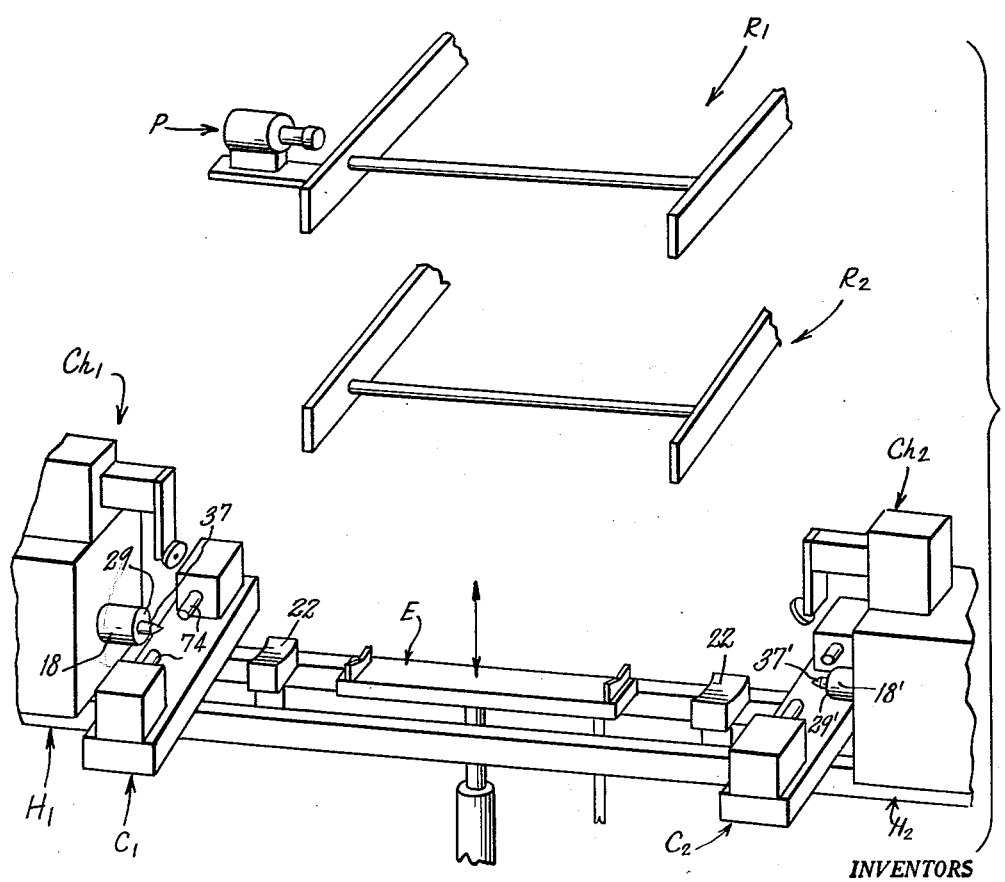
Fig. 2.
INVENTORS
WILLIAM R. MILLER
GEORGE B. ANDERSON
BY NORRIS E. BLECK
Kenyon & Kenyon
ATTORNEYS

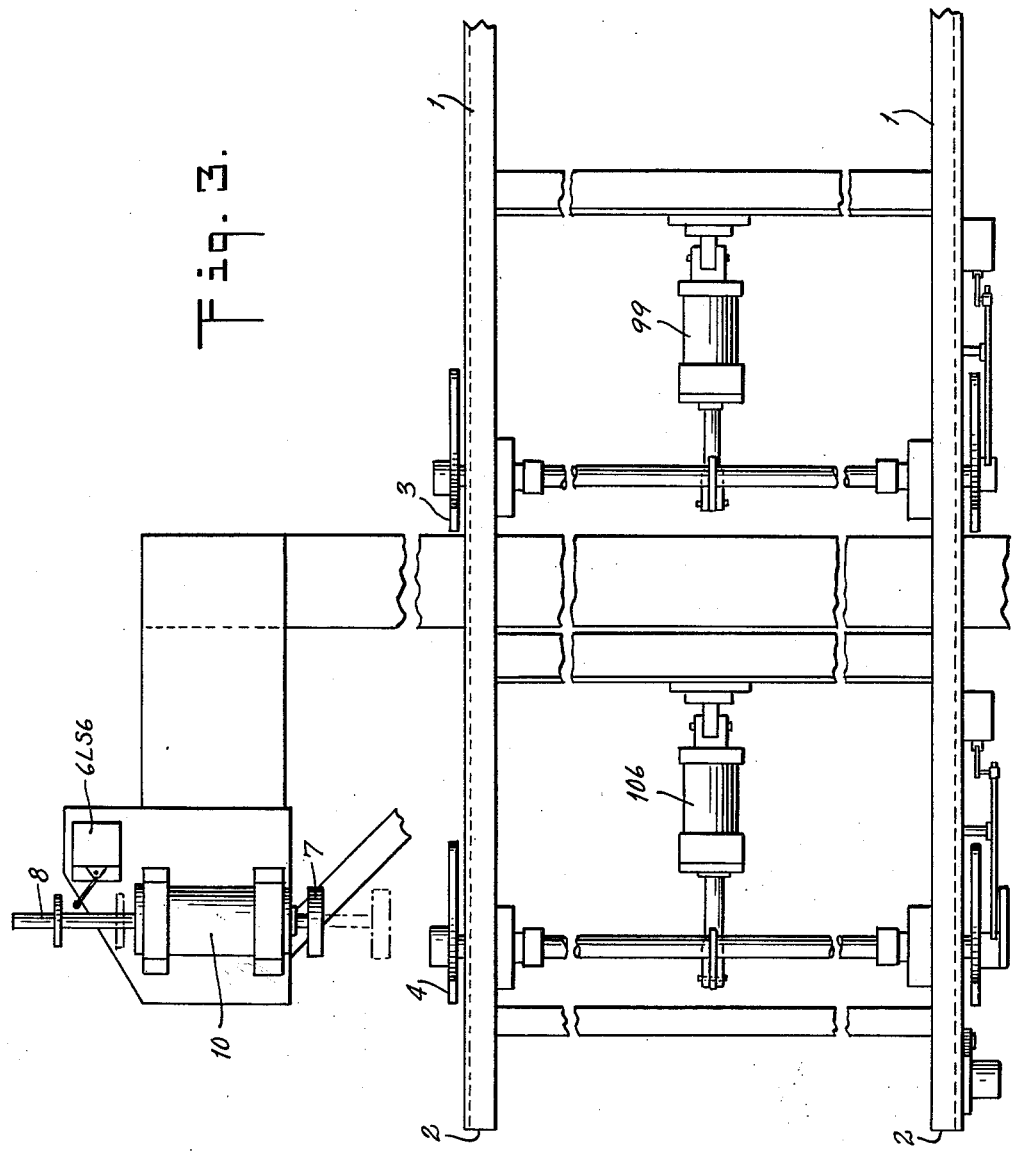

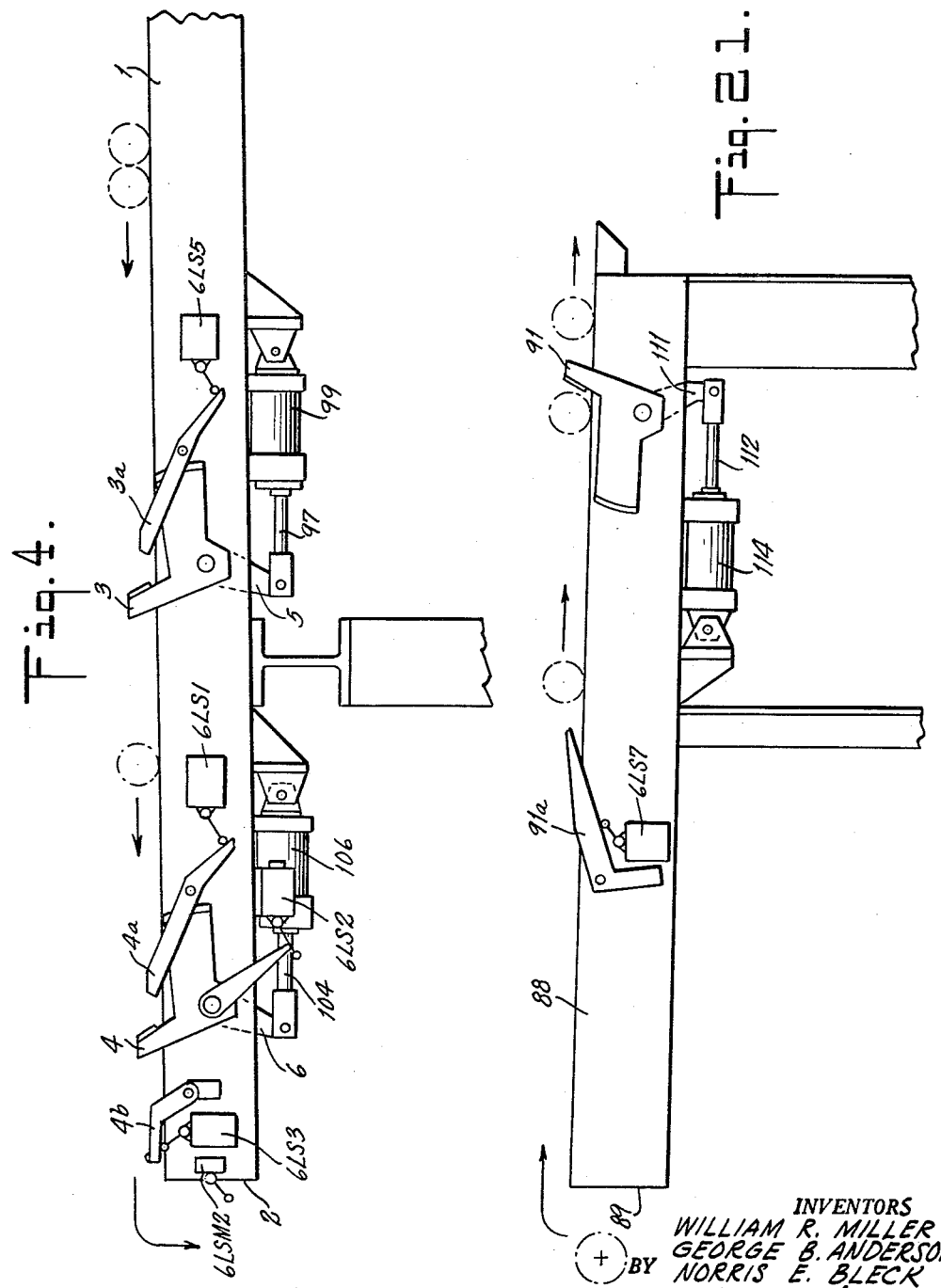

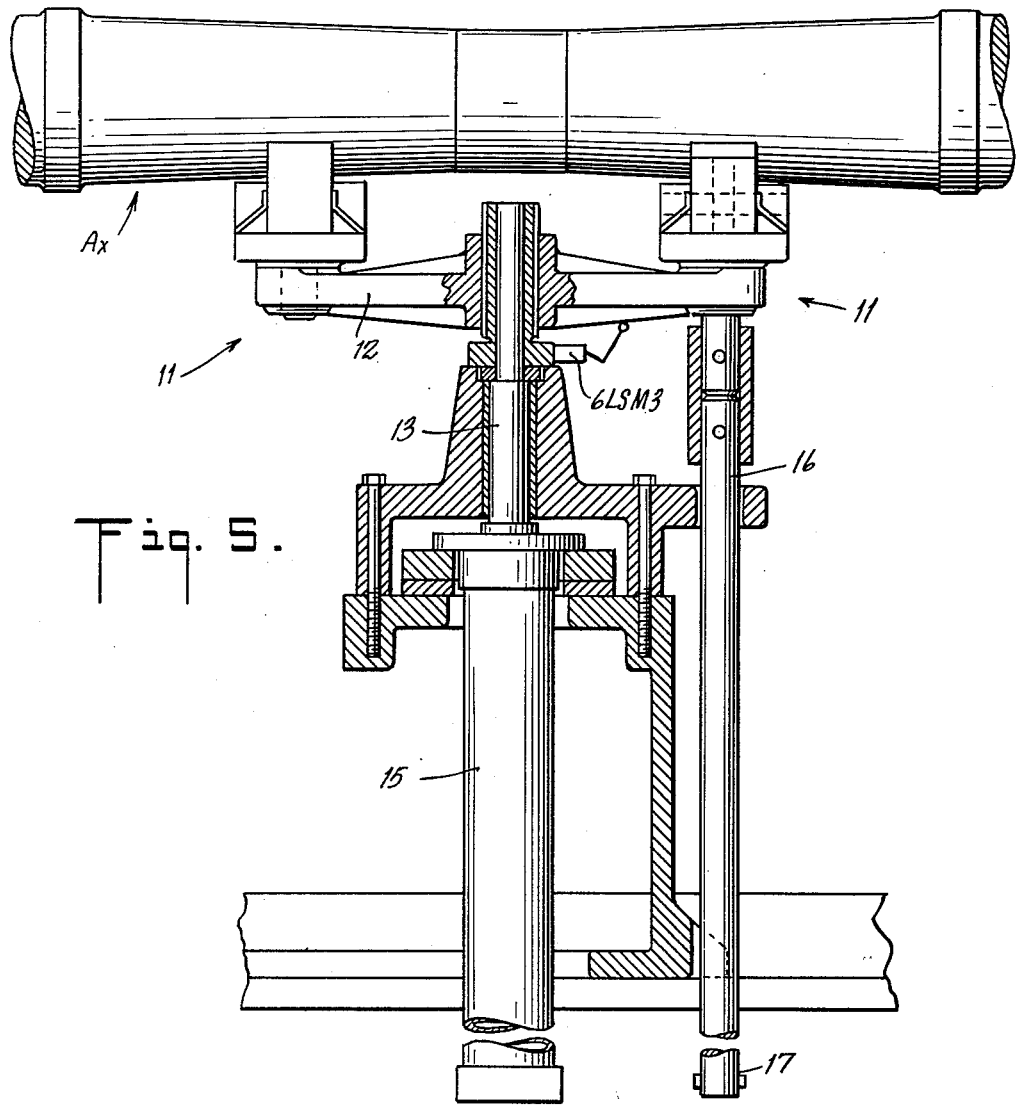
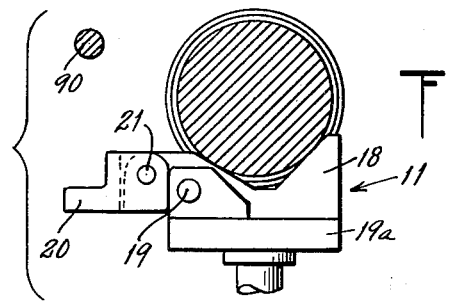

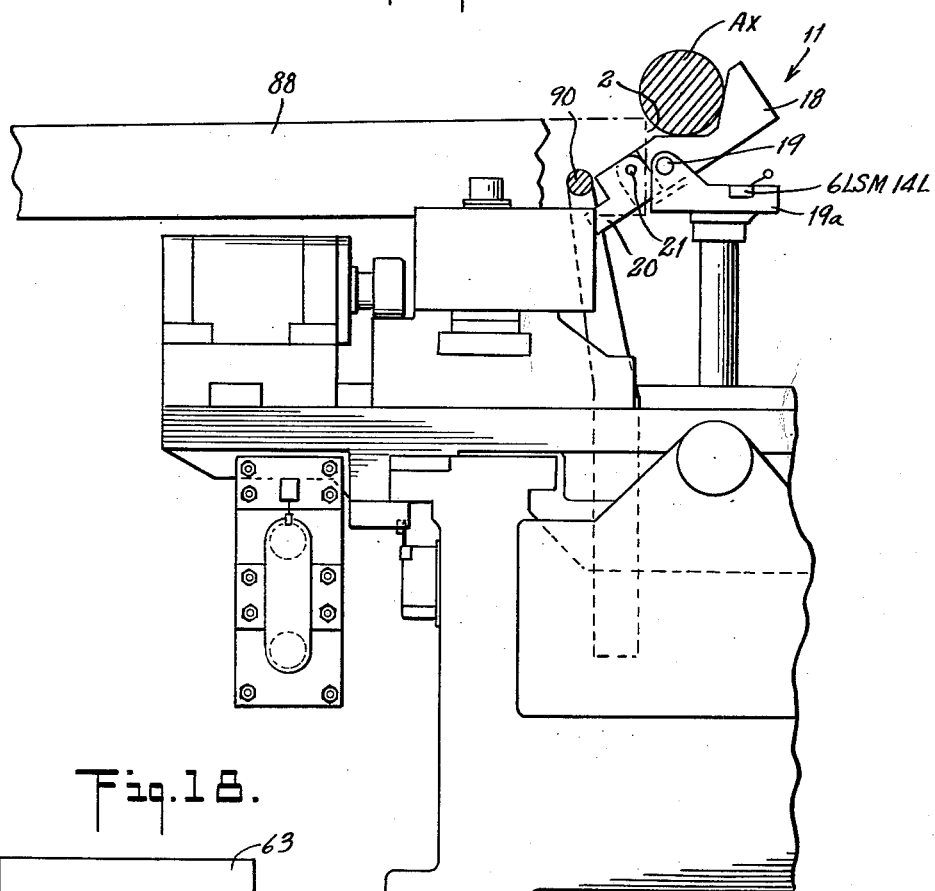
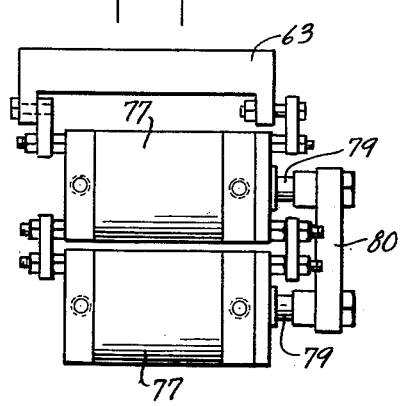

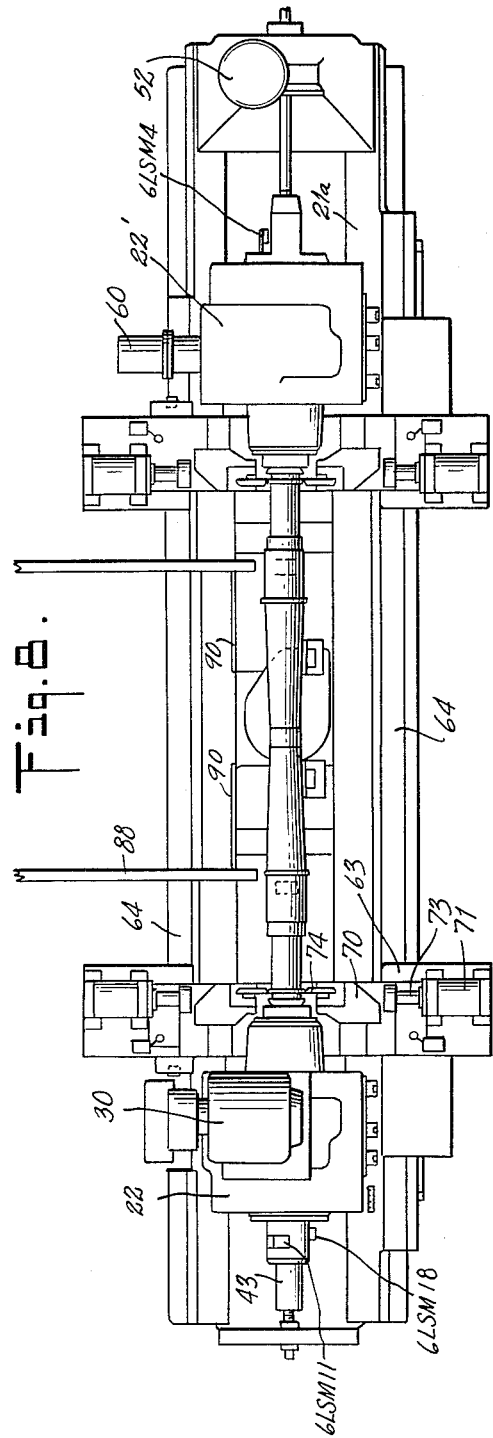
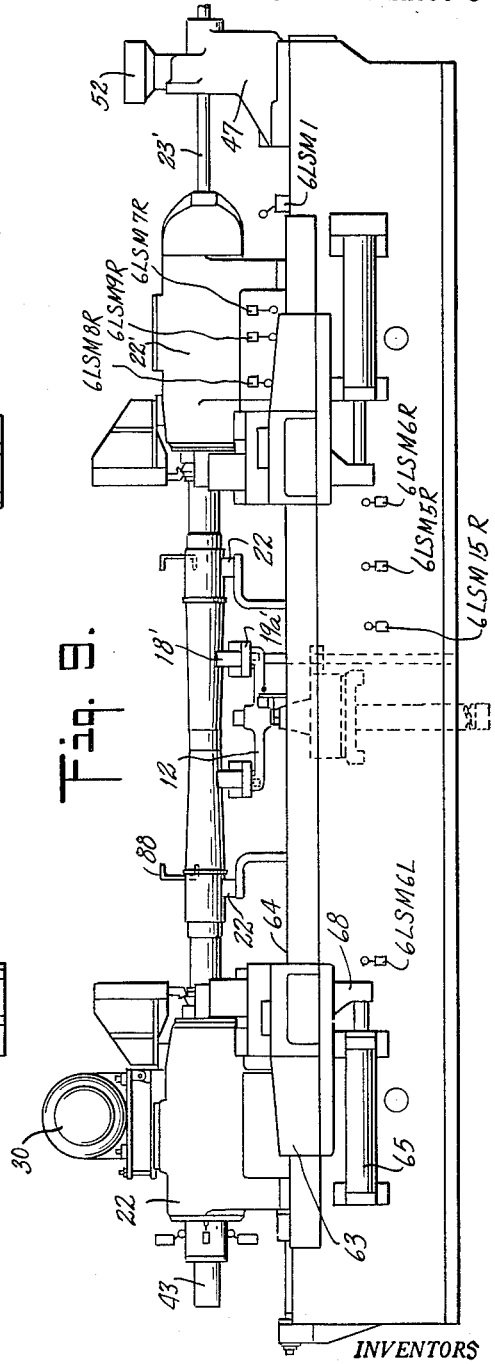

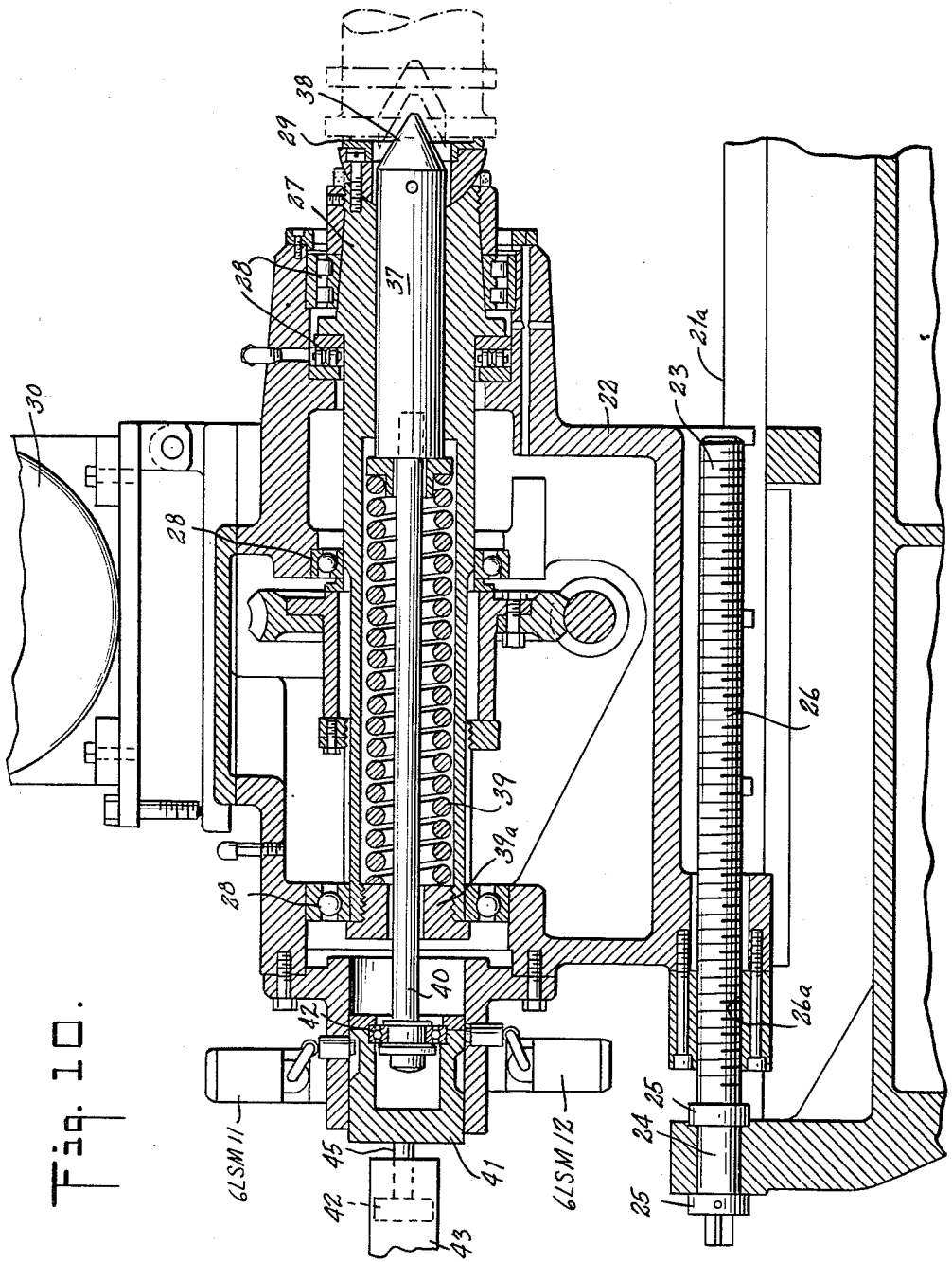

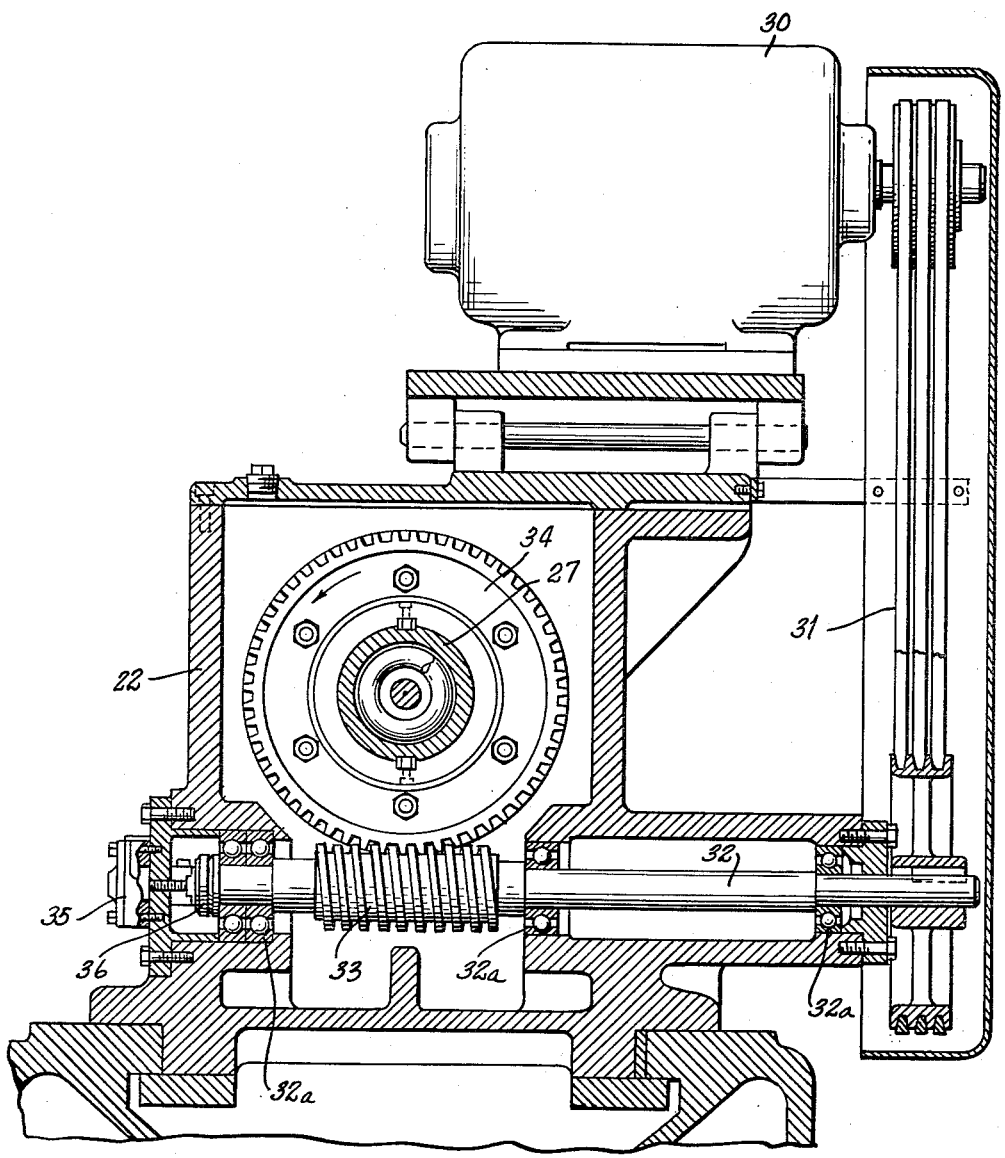

Jan. 19, 1965   W. R. MILLER ETAL   3,165,814
BURNISHING LATHE FOR AXLES
Filed May 4, 1960   20 Sheets—Sheet 9

INVENTORS
WILLIAM R. MILLER
GEORGE B. ANDERSON
BY NORRIS E. BLECK

Kenyon & Kenyon
ATTORNEYS

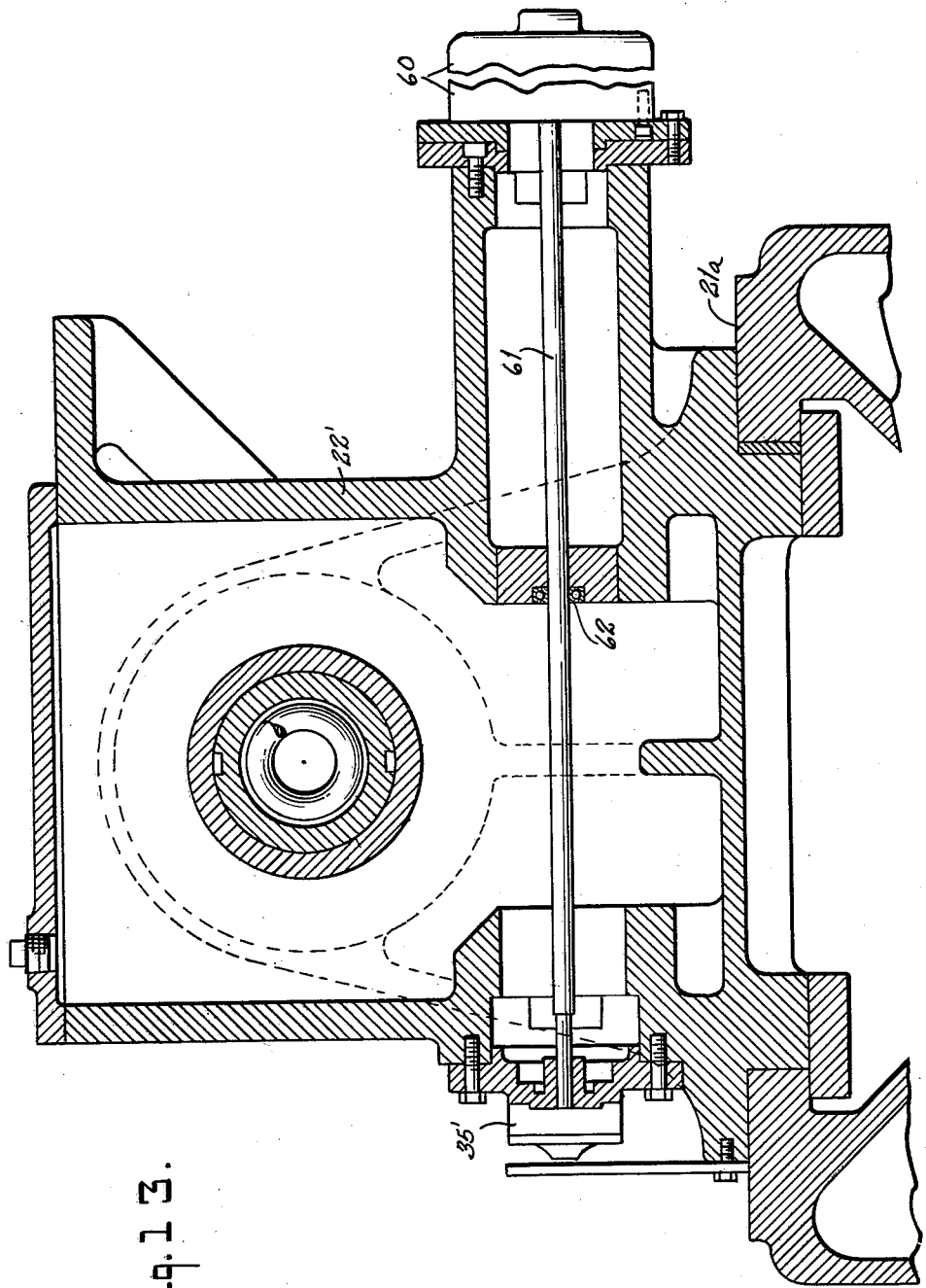

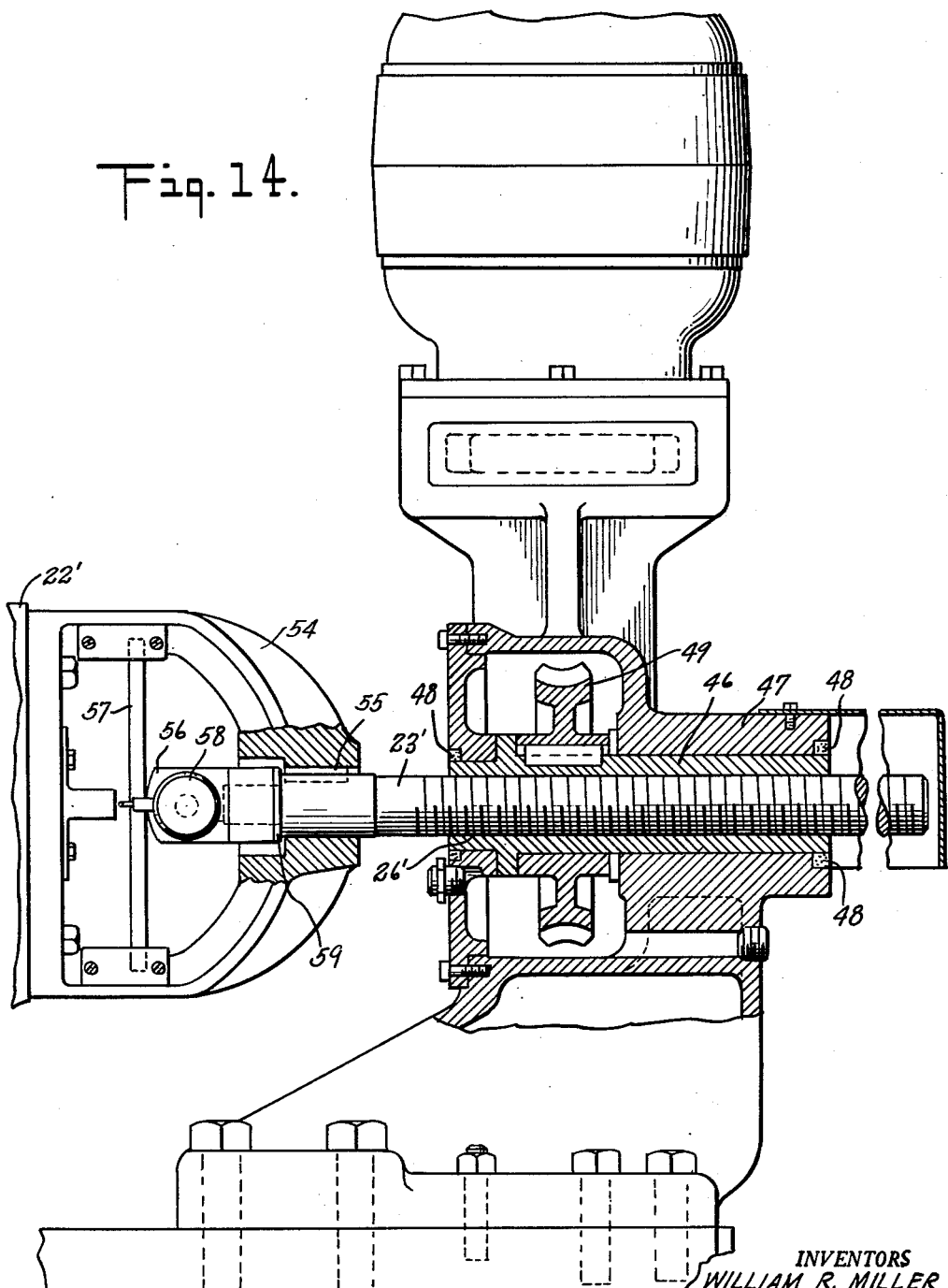

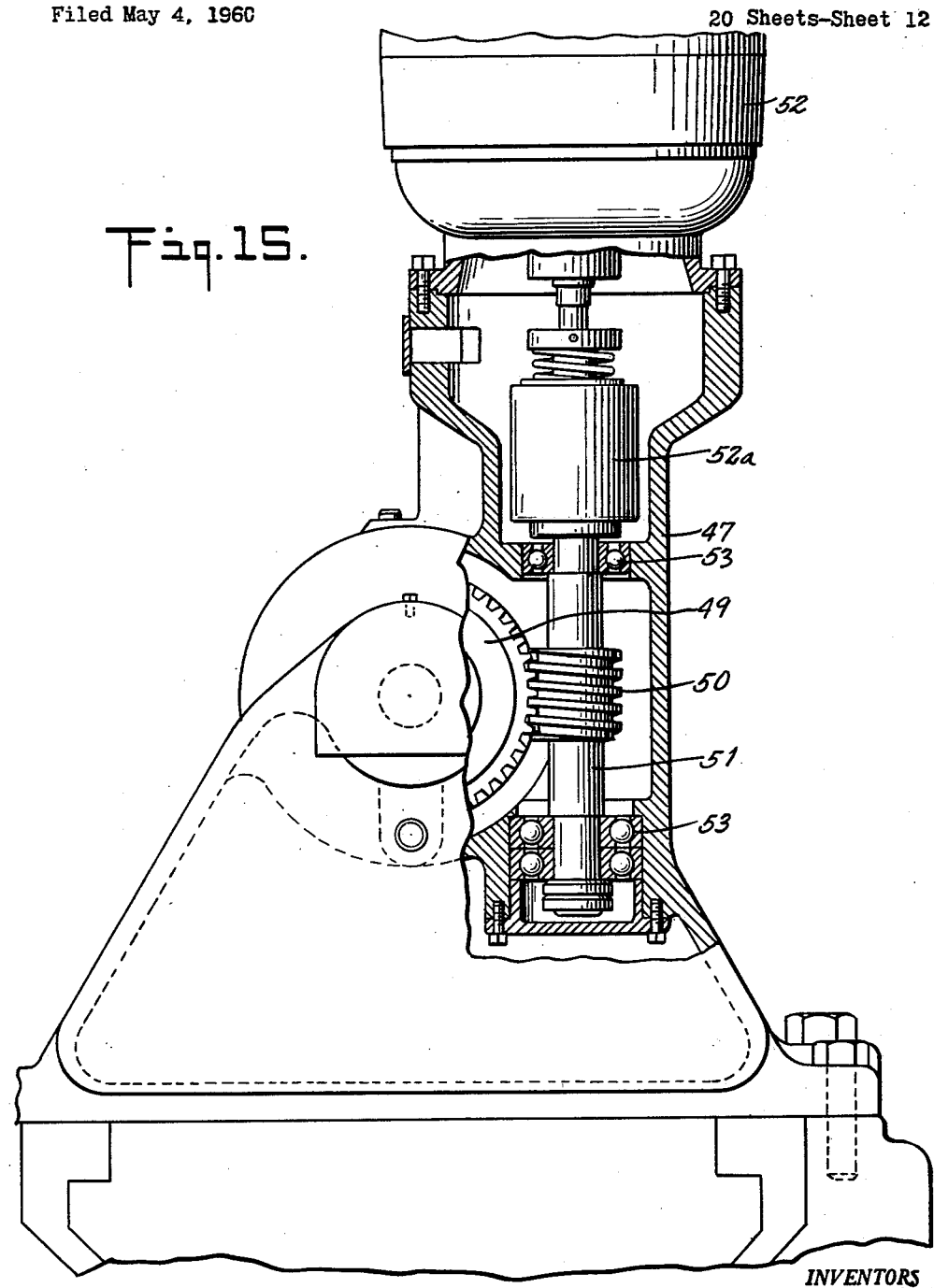

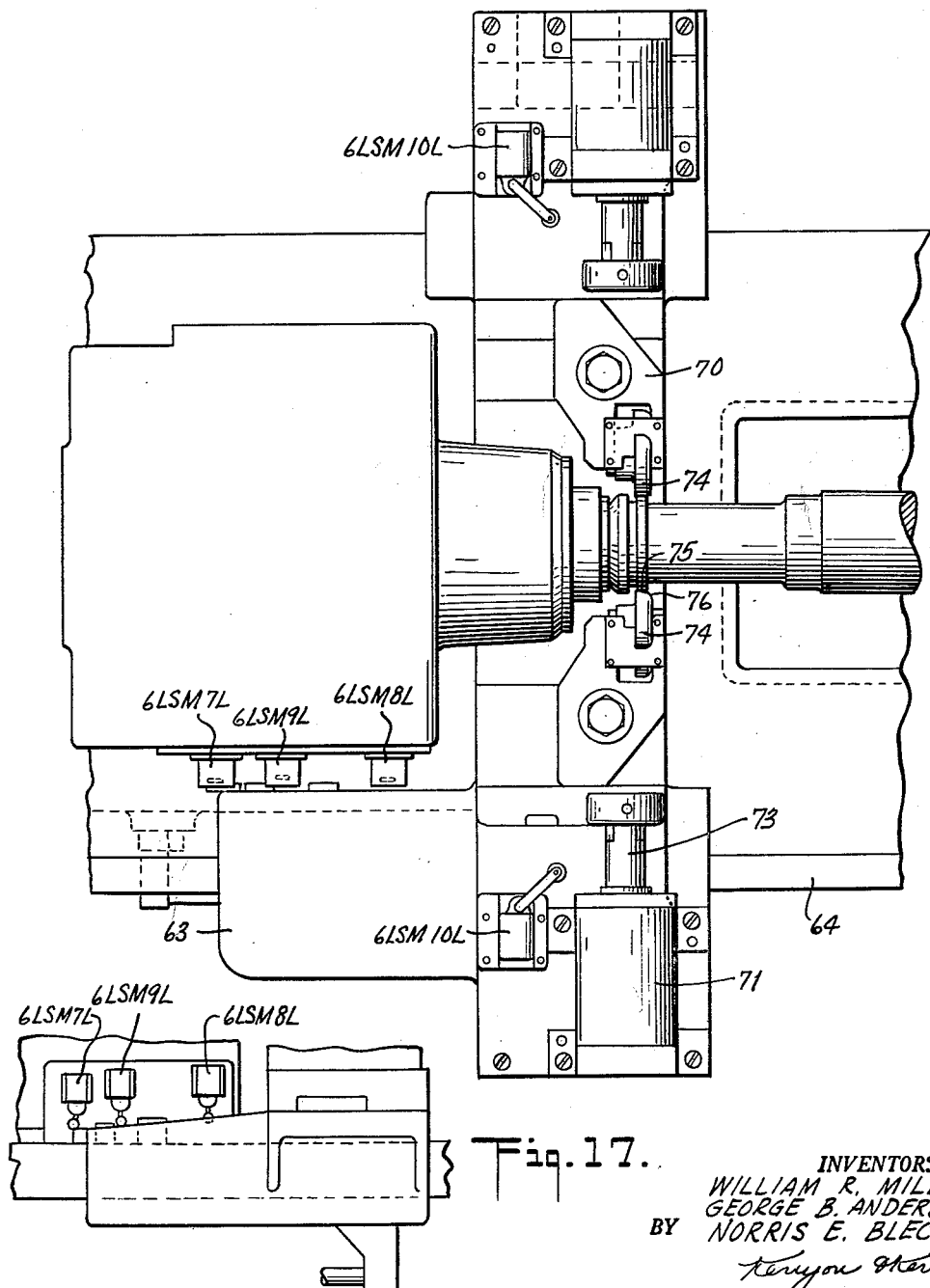

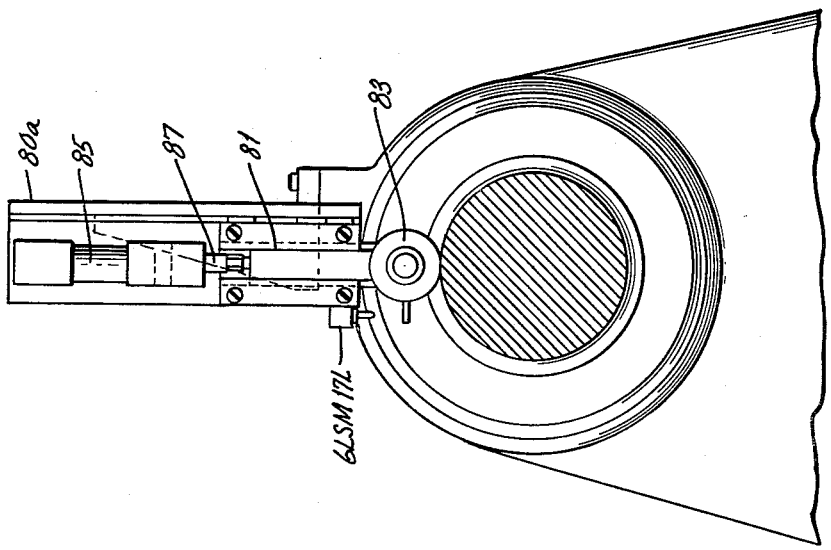
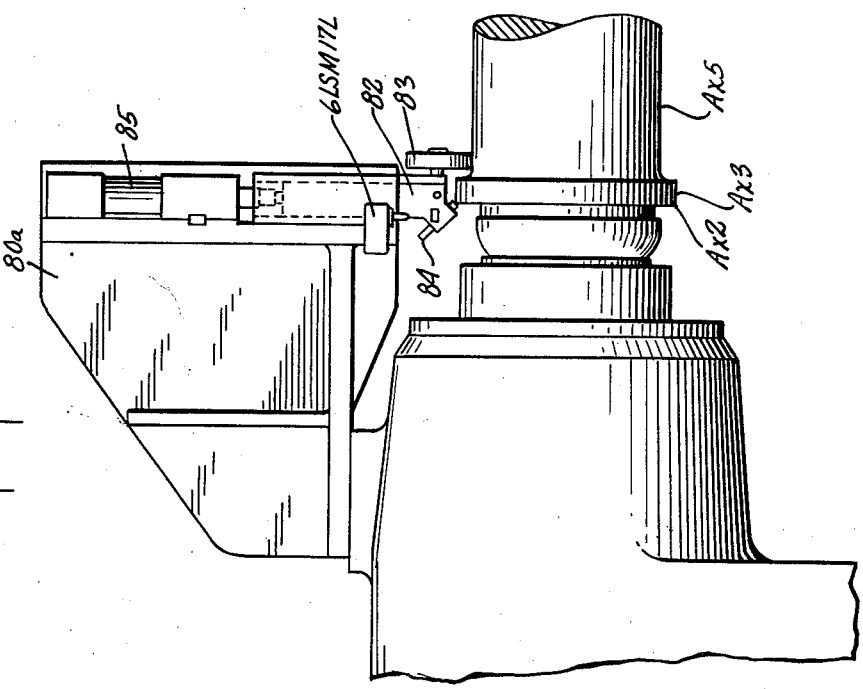

Jan. 19, 1965

W. R. MILLER ETAL 3,165,814

BURNISHING LATHE FOR AXLES

Filed May 4, 1960

INVENTORS
WILLIAM R. MILLER
GEORGE B. ANDERSON
NORRIS E. BLECK
BY
*Kenyon & Kenyon*
ATTORNEYS

Fig. 23.

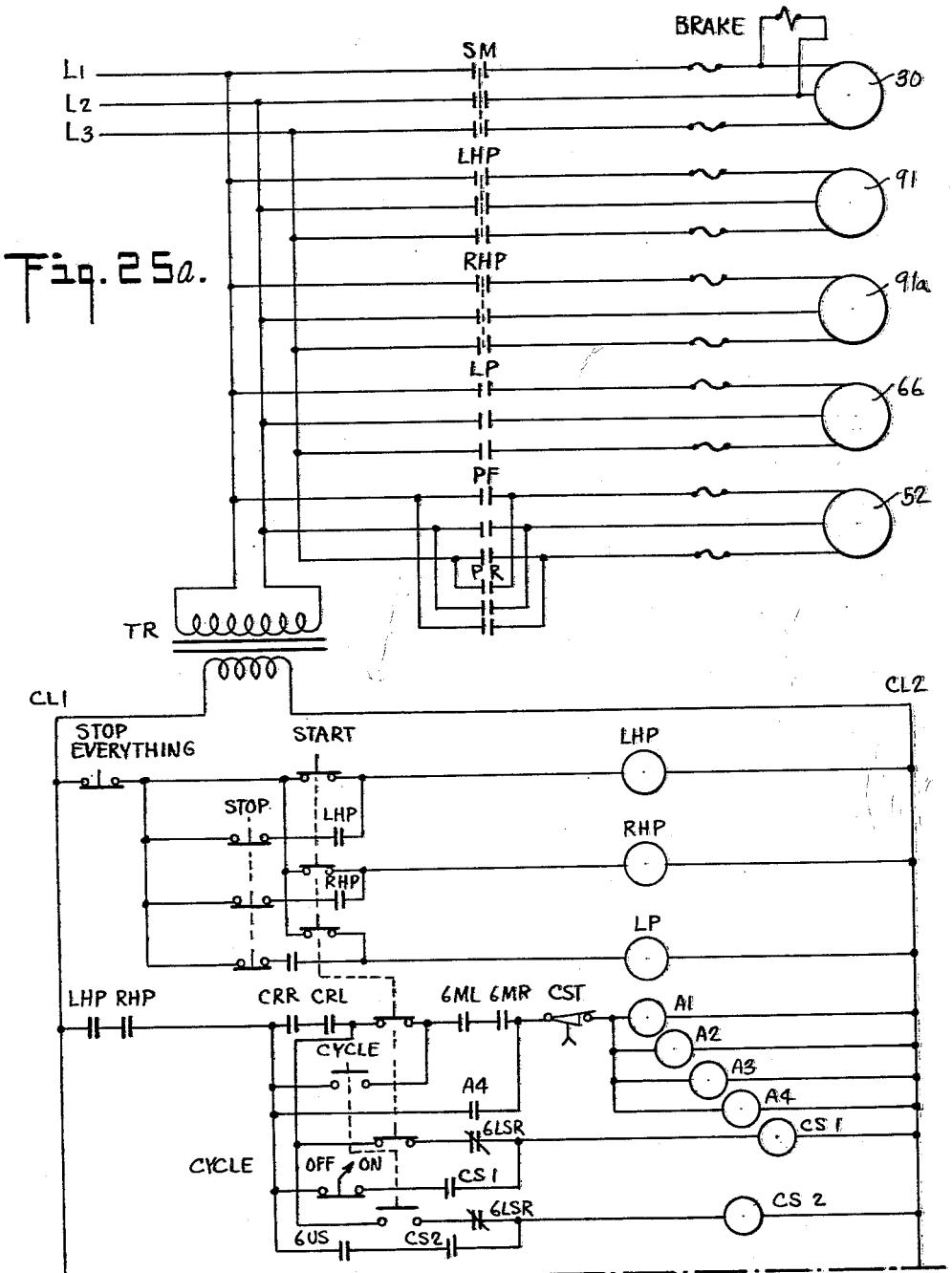

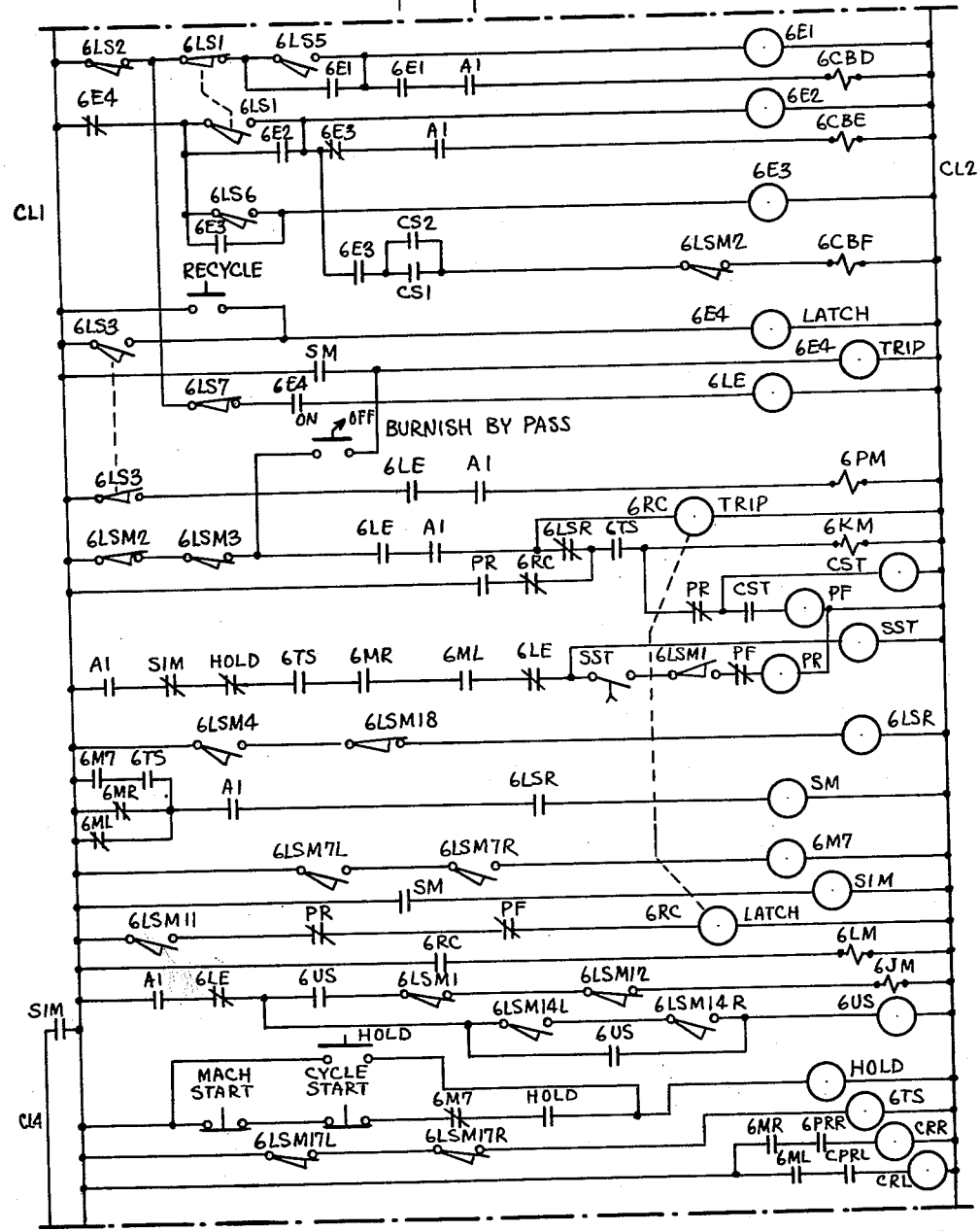

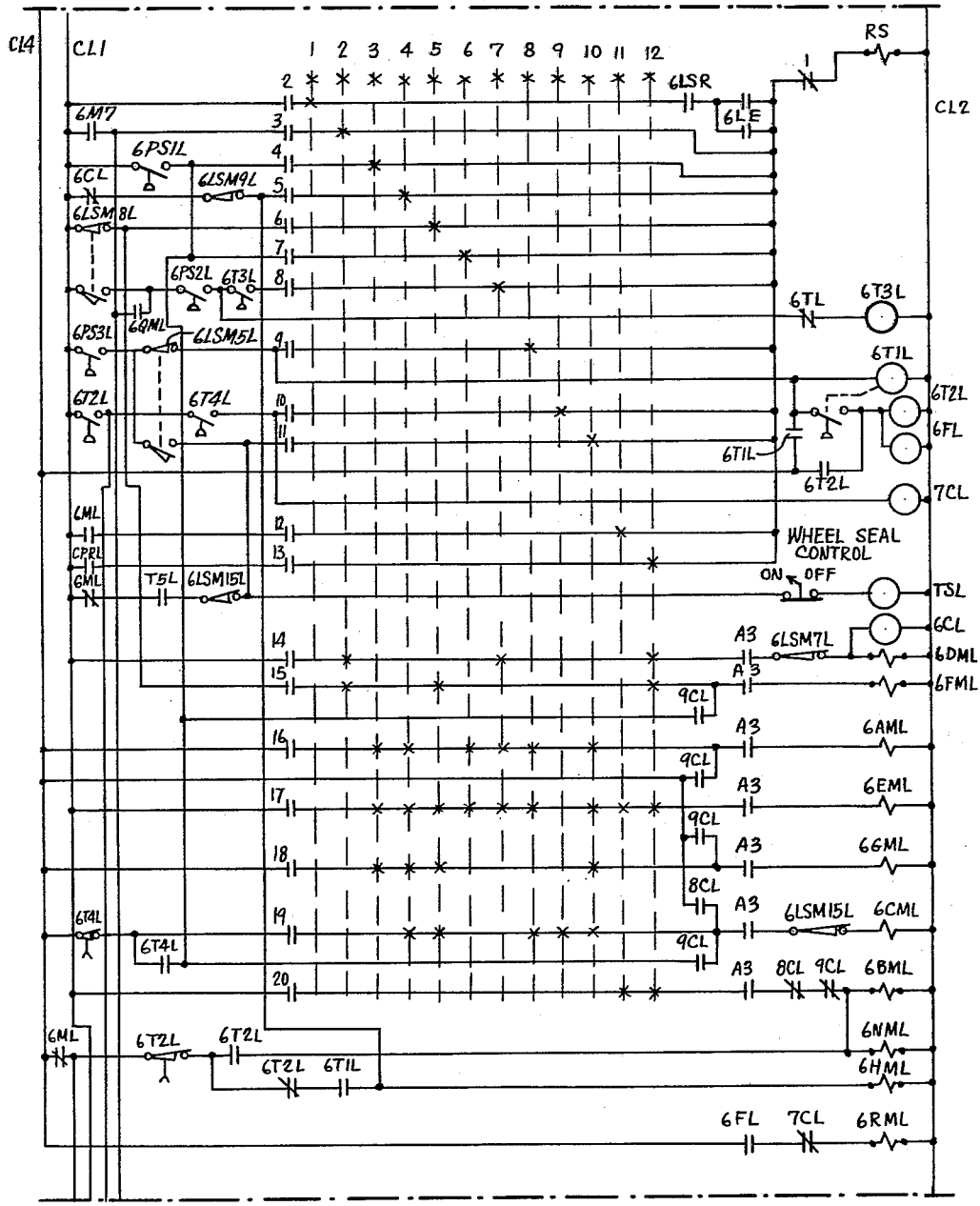

Jan. 19, 1965   W. R. MILLER ETAL   3,165,814
BURNISHING LATHE FOR AXLES
Filed May 4, 1960   20 Sheets-Sheet 20
Fig. 25d.
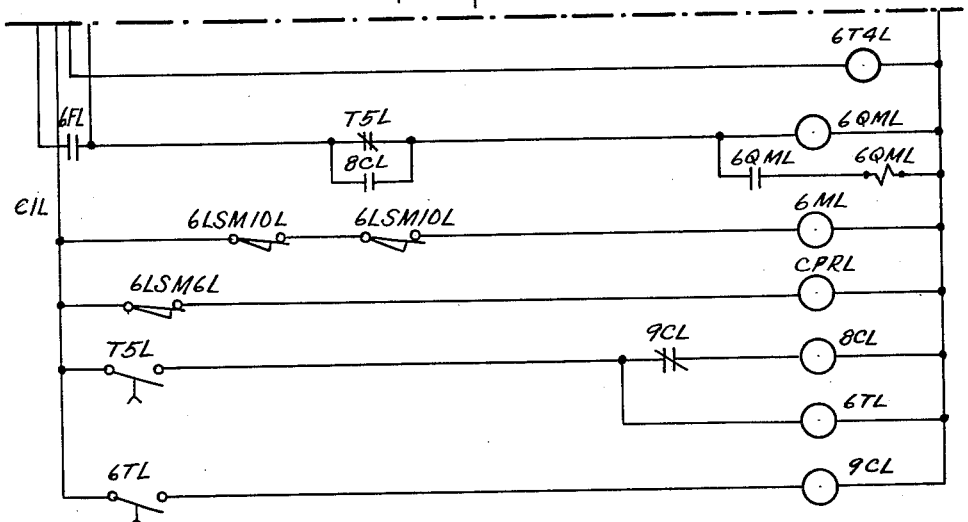
Fig. 27.
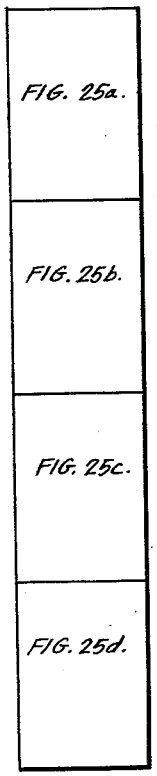
FIG. 25a.
FIG. 25b.
FIG. 25c.
FIG. 25d.
Fig. 26.
| | | OPEN | CLOSED |
|---|---|---|---|
| LIMIT SWITCHES | NORMALLY OPEN | | |
| | NORMALLY CLOSED | | |
| RELAYS | NORMALLY OPEN | —\|  \|— | —\|  \|— |
| | NORMALLY CLOSED | | |
| SWITCHES | NORMALLY OPEN | | |
| | NORMALLY CLOSED | | |
INVENTORS
WILLIAM R. MILLER
GEORGE B. ANDERSON
BY NORRIS E. BLECK
Kenyon & Kenyon
ATTORNEYS

United States Patent Office 3,165,814
Patented Jan. 19, 1965

3,165,814
BURNISHING LATHE FOR AXLES
William R. Miller, George B. Anderson, and Norris E. Bleck, Rochester, N.Y., assignors to Farrel Corporation, Ansonia, Conn., a corporation of Connecticut
Filed May 4, 1960, Ser. No. 26,837
20 Claims. (Cl. 29—90)

This invention relates to an automated machine tool combination adapted to receive and store a plurality of work pieces, to work on each piece for an operational cycle and to then deliver the pieces one at a time.

Although the principles of the invention may be applied to other fields and other kinds of work, the combination is particularly intended for heavy work as exemplified by railroad axles. The combination may be used alone or cooperatively with other machines and machine tool combinations. For example, the particular combination described in this application is a sub-combination of the automated railroad wheel shop disclosed and claimed by the Miller et al. Patent No. 3,085,311, issued April 16, 1963, in which it is particularly applicable to railroad axle burnishing operations.

As specifically exemplified by such railroad axle burnishing operations, the invention takes the form of a burnishing lathe provided with means for storing railroad axles, delivering them one at a time to the lathe, controlling the lathe as it runs through a more or less complicated series of burnishing operations, and then delivers the axles so that they can travel on for further processing. All of this is done in a fully automated manner.

As illustrated by the accompanying drawings the storage and delivery means take the form of upper and lower rail assemblies, while the axles are handled one at a time by an elevator. The burnishing lathe itself in some respects resembles a machine shop lathe in general. It has left and right hand heads providing spindles between which each axle is held and rotated, and carriages equipped with cross slides for the burnishing tools. The machine also has chamfering tools for chamfering the axle's collars.

One apparent object is to provide a practical means for handling railroad axles during the feeding, burnishing and delivery phases, in a manner that is practical for use under the operating conditions of a railroad wheel shop. In addition, an important object is to provide a means for controlling the carriage and cross head movements, which manipulate the burnishing tools, in an extremely accurate manner without necessitating the use of templates or the like in conjunction with tracers and the need for extreme precision servo-mechanisms, and which in addition operates independently of the exact diameters and lengths of the contoured parts which are burnished. These parts are exemplified by the axle's journal bearings, dust guards, wheel seats and collars and any other parts which may be improved by burnishing. Other objects may be inferred from the following.

The invention is described, in the form referred to above, by reference to the accompanying drawings in which:

FIG. 1 is a partial side view of a railroad axle which may be burnished according to the teaching of the present invention;

FIG. 2 is a simplified sketch of a burnishing machine combination which embodies this invention;

FIG. 3 is a top view of the upper rail assembly over which axles are delivered to the burnishing machine combination;

FIG. 4 is a partial side view of the upper rail assembly of FIG. 3;

FIG. 5 is a front view of an elevator assembly adapted for transporting axles to and from the burnishing lathe;

FIG. 6 is a side view of an axle saddle assembly forming a part of the elevator assembly of FIG. 5;

FIG. 7 is a partial side view of the axle saddle assembly of FIG. 6, the burnishing lathe combination of FIG. 8, and the lower rail assembly of FIG. 21;

FIG. 8 is a top view of the burnishing lathe assembly and the ends of the lower rail assembly of FIG. 21;

FIG. 9 is a front view of the burnishing lathe assembly and the lower rail assembly of FIG. 21;

FIG. 10 is a side and partial sectional view of the left hand head of the burnishing lathe combination;

FIG. 11 is an end and partial sectional view of the left hand head of FIG. 10 and its spindle drive assembly;

FIG. 13 is an end and partial sectional view of the right hand head assembly of FIG. 12 and its lubricating gear pump assembly;

FIG. 14 is a side and partial sectional view of the right hand head and its adjusting screw assembly;

FIG. 15 is a partial end and sectional view of the burnishing lathe and in particular the right hand head adjusting screw assembly of FIG. 14;

FIG. 16 is a top view of the left hand carriage assembly for the burnishing lathe;

FIG. 17 is a partial front view of the left hand carriage of FIG. 16;

FIG. 18 is a partial back view of the carriage of FIG. 16 and particularly its synchronizing cylinder assembly;

FIG. 19 is a partial side view of the left hand head and particularly the left hand chamfer assembly;

FIG. 20 is a partial end view of the left hand head and chamfer assembly of FIG. 19;

FIG. 21 is a side view of the lower rail assembly over which axles are delivered from the machine;

FIG. 23 is a hydraulic schematic diagram for the center, carriage, carriage cross slide, and the chamfer assembly cross slide associated with the left hand end of the burnishing lathe;

Figure 12:
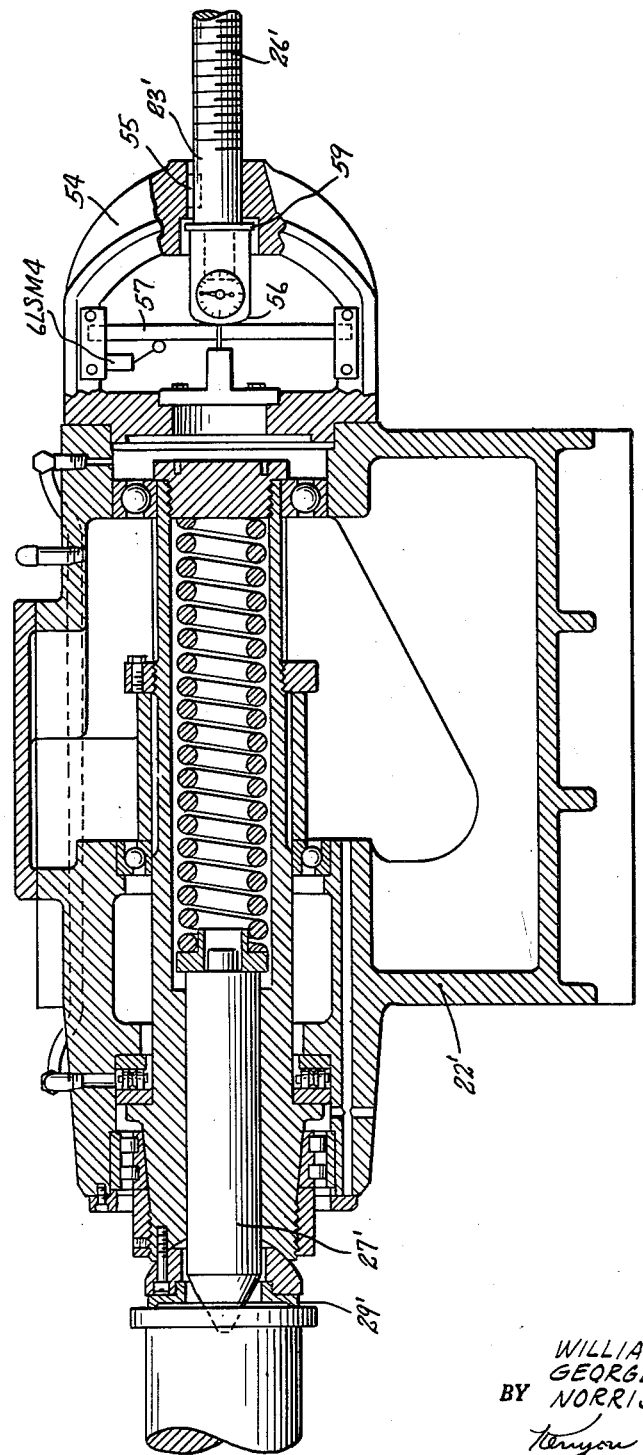
FIG. 12 is a side and partial sectional view of the right hand head of the burnishing machine assembly.

FIGS. 25a, 25b, 25c and 25d combined is an electric schematic diagram for a portion of the burnishing machine combination;

FIG. 26 identifies switch types shown in the above diagram; and

FIG. 27 shows the relationship between the parts of the FIG. 25 series.

Referring to FIG. 1, railroad axles have machined end parts each comprising from the outer end inwardly a collar or button having an edge $Ax2$ and a peripheral surface $Ax3$, a shoulder $Ax4$, a journal $Ax5$ of smaller diameter than the collar, a shoulder $Ax6$, a dust guard bearing surface $Ax7$ of larger diameter than the journal, a shoulder $Ax8$ and a wheel seat $Ax9$ of larger diameter than the dust guard bearing surface $Ax7$. The axle from the wheel seat inwardly to its center is rough and functions as a structural part. A railroad axle customarily is reconditioned a number of times during its service life and each reconditioning involves the use of an axle lathe which machines the mentioned parts to smaller diameters each time. A new axle must have its ends initially machined to form these parts. After machining these parts are burnished in some or all instances to give them a smoother finish than obtained by the initial machining.

This embodiment of the present invention can receive and store a plurality of such railroad axles. The diameter dimensions of these axles may range from the maximum presented by new axles to the smaller sizes of those axles which have been worn and previously reconditioned one or more times. The axles are successively conveyed to the burnishing lathe which burnishes the different machined parts with a predetermined sequence and burnishing pressures which are uniform regardless of differences in the diameters or lengths of these parts. The burnished axles are then transported one at a time to a storage facility from which they can be delivered as desired.

All of the above operations are fully automatic and do not require manual labor or human attention.

This embodiment of the present invention will be briefly outlined in advance of a detailed description, by reference to FIG. 2. In the following brief summary, furnished to acquaint the reader with the general character of the apparatus, the parts are identified out of numerical order. The parts are described in numerical order in the detailed description which follows.

Axles feed to the burnishing machine combination on an upper rail assembly $R_1$ which stores them. They are first transversely positioned on the rail assembly by a positioning apparatus P and then released one at a time to roll by the force of gravity on to an elevator E with which they register because of the action of the apparatus P.

Elevator E lowers the axles one at a time on to axle supports 22 which are located between the heads of the burnishing lathe having left and right hand lathe centers.

The left hand center 37 by itself and the right hand center 37' moving with it head $H_2$, advance toward each other. The centers seat in the lathe centers $Ax1$ which are conical recesses on the axle axis, in the respective ends of the axle, and with cam-like action lift the axle from the burnishing machine axle supports 22. This centers the axle in the burnishing lathe and clears it from the supports 22.

The right hand head $H_2$ and center 37' overpower the left hand center 37 which is biased forwardly but can move backwardly, forcing it to retract into the left hand head $H_1$ until the axle is firmly gripped between frictionally engaging drive plates 29 and 29' of each spindle 18 and 18'. The right hand center can retreat as required for this action.

The spindle of the left hand head is powered to rotate the axle.

Right and left hand carriage assemblies $C_1$ and $C_2$ support the burnishing rolls 74 and 74'.

In the operational cycle, which uses hydraulic power and is the same for each carriage assembly, the burnishing rolls 74 (and 74') are initially moved against the surface of the button $Ax3$ proximate to the end of the axle. Low pressure is built up because of the resulting reaction, and the rolls feed across the surface toward the center of the axle automatically because of this pressure increase. In sequence, the rolls 74 also burnish the shoulder $Ax4$ between journal $Ax5$ and button $Ax3$, the journal $Ax5$, the shoulder $Ax6$, between the journal $Ax5$ and the dust collar $Ax7$, and optionally the wheel seat $Ax9$. Each stage or phase is controlled by corresponding pressure changes or time sequences initiated by pressure changes. Tthe change occur when the tools engage the parts of the work piece itself. Therefore, templates, etc. are not required.

During these operations by the carriage assemblies, chamfer assemblies $Ch_1$ and $Ch_2$ operate to position chamfer tools 84 and 84' against the outer circumference $Ax2$ of each end of the axle.

After both carriage and chamfer assemblies have operated and retracted; the left hand center 37 extends as the right hand head and center 37' retract, to position the axle again to the right and over the lathe axle supports 22a and then both the left hand center 37 and the right hand center 37' and head $H_2$ retract to release the axle onto those supports.

The elevator E, then carries the axle upward, depositing it on the lower rail assembly $R_2$, which may thereafter deliver the burnished axles as desired.

In more detail, the upper rail assembly, $R_1$ is described with particular reference to FIGS. 3 and 4.

The assembly comprises laterally spaced rails 1 which cooperatively provide an axle storage surface sloping slightly downwardly towards their ends 2. Axles delivered to the upper portion of the rails 1 roll toward the ends 2 until arrested by a first escapement 3 or a second escapement 4. Each escapement is powered by an air cylinder 99 and 106 respectively, referred to in more detail hereinafter. Three trips, which actuate limit switches, are located along one rail to be depressed by the weight of an axle over them. Trip $3a$ is positioned just above the first escapement 3, trip $4a$ is just above the second escapement 4, and trip $4b$ is below it.

Opposite to the spot which would be occupied by an axle retained by the second escapement 4 on the rails 1, and laterally spaced from it, is an axle positioning apparatus P (FIG. 3), comprising an end plate 7 adapted to contact the end of an axle and attached by a connecting rod 8 to a piston 9 of a double-acting pneumatic cylinder 10.

The elevator assembly E (FIGS. 5 and 6) is positioned to move axle supporting saddles 11 up and down adjacent to the delivery ends 2 of the rails 1. The axle saddles 11 are mounted and supported by a horizontal bar 12 to form an axle saddle assembly which is attached to the upper end of a vertical piston rod 13 which connects with a piston 14 in a hydraulic cylinder 15. The axle saddle assembly and its piston rod 13 are held against rotation by a guide rod 16 which slides through an anchored bearing 17. The cylinder 15 and bearing 17 are connected to the machine assembly to make the axle saddle assembly operate in a plane perpendicular to the upper rails 1 at their delivery ends 2.

The left hand axle saddle is in the form of an assembly (as is the right hand one) comprising saddle supports 18 mounted on pivots 19 and urged by gravity to rest in a horizontal position against a plate $19a$ at one end of the bar 12 and adapted to receive and support an axle for transport in that position.

Pawls 20 (and 20') are mounted to the axle saddle supports 18 by pivots 21, which are located toward the end of the saddle 11 nearest to the rails 1 from the main saddle support pivots 19. The pawls are urged by gravity into a horizontal position in which they are retained by an end portion of the saddle supports 18 and in which they project farthest from the saddle assembly 11 toward the rails.

When a finished axle is to be delivered, the elevator carrying the axle rises past a second and lower set of rails 88 laterally spaced, and the pawls are engaged by an abutment 90 which cause the pawls and the connected saddle supports 18 to rock around the pivots 19 toward the lower rails 88, causing the axle to roll onto the latter. When the elevator E moves downwardly, past the lower rails 88 and their abutment 90, carrying an axle for delivery to the burnishing lathe, the pawls 20 pivot upwardly on their own pivots 21 without disturbing the axle saddle supports 18.

A burnishing lathe (FIGS. 8 and 9) is located to receive the axle $Ax$ delivered by the elevator on the lathe axle supports 22, substantially centrally with respect to the lathe.

The lathe includes a left hand head assembly $H_1$, a left hand carriage assembly $C_1$, a right hand carriage assembly $C_2$ and a right hand head assembly $H_2$. Each head assembly supports, in turn, chamfer assemblies $Ch_1$ and $Ch_2$ respectively. The head assemblies are slidably adjustable along the bed on guideways or ways $21a$, the carriages operate on guideway 64.

The left hand head assembly $H_1$, shown particularly well in FIGS. 10 and 11, comprises a housing 22 slidably mounted on the ways 21a of the bed. The housing position longitudinally along the ways can be adjusted by the rotation of a screw 23. This screw is fixed in a stationary bearing 24, by collars 25, and engages threads 26 formed in a bore 26a in the housing 22.

A tubular spindle 27 extends through the housing 22 horizontally and is journaled to the housing through bearings 28. The inner or right hand end of this spindle has a driver plate 29 for frictionally engaging the flat end of the axle. This spindle is rotatively driven by an electric motor 30 through a belt drive 31 and shaft 32 which rotates a worm 33 which meshes with a worm gear 34 keyed to and encircling the spindle 27.

A lubricating oil gear pump 35 for circulating oil through the left hand head is mounted on the housing 22 and powered by an extension of the shaft 32 through a coupling 36. The shaft 32 is journaled by the housing 22 through bearings 32a.

The lathe center 37 has a point 38 and is reciprocatively located within the right hand end of the tubular spindle 27. The center 37 is retractably urged outwardly past the driver plate 29 by a compression coil spring 39 which at its right end bears against the inner end of this center 37, and at its left end bears against an abutment 39a attached to the left hand or rear end of the spindle 27. A tension rod 40 is attached to the rear or left hand portion of the center 37, and it extends to the left through the abutment 39 and is attached at the other end to a cross head 41 through bearings 42 which permit the tension rod 40 to freely rotate with the center 37 and spindle 27 while the cross head remains stationary.

The cross head 41 (and therefore the center 37) may be reciprocatively controlled by the double-acting piston 44 in the hydraulic cylinder 43, acting through a connecting rod 45.

The tension rod 40 is of a length appropriate to allow the center 37 to be held in a normal position, in which it supports an axle in its running position against the drive collar 29, and alternatively, to be extended or retracted from that position during axle handling operations.

The right hand head $H_2$, shown particularly in FIGS. 12, 13, 14 and 15, has many parts which correspond to those of the left hand head assembly and these have been given the numbers of those left hand parts, primed for identification.

Referring especially to FIG. 14, the right hand head 22' has an adjusting screw 23'. This screw 23' engages threads 26' of a nut 46 which is rotatably journaled in a housing 47 by bearings 48. The nut 46 is keyed to a worm gear 49 which is in mesh with a worm 50 keyed to a vertical shaft 51, journaled by bearings 53, in the housing 47. This shaft 51 is powered by a reversing electric motor 52 through a drive unit 52a which disconnects the motor from the shaft 51 when a predetermined torque is attained. The tower-like housing 47 is immovably mounted on the right hand end of the ways 21a of the bed, and the assembly is used to move the right hand head back and forth along the ways 21a for each operational cycle of the machine, whereas the left hand head normally remains in a fixed position.

The left hand end of the right hand adjusting screw 23' slidably passes through an opening in a yoke 54 which has its ends fastened to the right hand head housing 22'. The rotation of the adjusting screw 23' in the yoke 54 is prevented by a key 55. The extreme left hand end 56 of the adjusting screw bears against a leaf spring 57. The ends of the spring 57 are fastened to the yoke 54 and through it to the housing of the right hand head 22'.

Rotating the nut 46 to power the adjusting screw in a leftward direction, forces the screw's extreme end 56 against the spring 57 and urges the right hand head to the left, deflecting the spring 57 in proportion to the resistance encountered. This deflection, and hence the adjusting pressure exerted, may be measured by a dial micrometer 58. Retraction of the right hand adjusting screw 23' retracts the right hand head, because a collar 59 is attached to the left hand end of the screw and engages an inner face on the yoke 54.

The right hand head, unlike the left hand head, does not have a means for reciprocating the center 37' within the spindle 27' since the center's position over the bed 21 of the lathe may be controlled by reciprocating the entire head by means of the tower assembly described in the preceding paragraph.

The right hand head also lacks provision for rotatably powering the spindle 27', and the right hand head lubricating gear pump 35', mounted in the right hand head housing 22', is separately powered by a motor 60, which is also mounted in the housing 22', through a shaft 61 rotatably journaled by bearings 62 to the same housing 22'.

The carriages $C_1$ and $C_2$ will be described with particular reference to FIGS. 8, 9, 16 and 18. Since the left and right carriages are similar, only the left hand carriage $C_1$ will be explicitly described in detail, and the corresponding parts of the right carriage will be given the same identification number, but primed.

The carriage 63 rides longitudinally along the lathe bed on the ways 64. The position of the carriage along the ways 63 is controlled by the operation of a hydraulic cylinder 65, which powers the carriage 63 through a double-acting piston 66, connecting rod 67, and a downward projection 68 of the carriage 63.

The carriage 63 has a cross slide or guideway running horizontally across the carriage 63 perpendicular to the ways 64, and across slide tool holder 70 is mounted on each end of the cross slide to slide thereon, and the position of each tool holder along the slide is controlled by the operation of a hydraulic cylinder 71, double-acting piston 72 and connecting rod 73. There is one hydraulic cylinder 71 for each extreme end of the carriage 63.

Each tool holder 70 mounts a burnishing tool 74 which is journaled to the holder to rotate as freely as possible, even when bearing against the axle parts with considerable force. The burnishing tool 74 has a highly polished working surface which may be shaped appropriately for various burnishing operations, and in this particular example has a generally cylindrical portion 75 merging smoothly into a convex portion 76. The burnishing surfaces should finish as close to perfect smoothness as is possible.

Both burnishing rolls 74 of the same carriage should move synchronously into contact with the axle part being burnished and thereupon exert equal burnishing pressure. This may be accomplished by mounting pairs of hydraulic synchronizing cylinders 77 (FIG. 18) on the carriages. Each cylinder contains a piston 78 powering a connecting rod 79. The connecting rods of each pair of cylinders are rigidly interconnected by a cross head 80 to compel the pistons to reciprocate synchronously. Each synchronizing cylinder 77 is hydraulically connected to one of the cross slide cylinders 71, so that as the pistons 78 of the synchronizing cylinders 77 work together simultaneously, the pistons 72 of the cross slide cylinders 71, and therefore the burnishing tools 74, likewise work together simultaneously. The hydraulic system is described later in detail.

Each lathe head housing 22 and 22' mounts a chamfer assembly housing 80a and 80a' respectively on its upper portion adjacent to the end carrying the spindles and centers 37 and 37'. These chamfer assemblies $Ch_1$ and $Ch_2$ will be described with particular reference to FIGS. 19 and 20, and since both chamfer assemblies are similar, only the left hand one will be described in detail, and the corresponding parts of the right assembly will be given the same numbers primed.

The chamfer assembly housing 80a mounts a vertical cross slide 81 which guides a tool mount 82. The lower portion of the tool mount 82 is adapted to carry a cylindrical gauging roller 83 which has a horizontal axis of rotation parallel to the bed of the lathe, and a chamfer tool 84 which has an axis or rotation like that of the gauging roller but inclined upwardly toward the center of the lathe bed to chamfer cut the axle corner $Ax2$.

The chamfer assembly housing, cross slide and tool mount are arranged so that when the tool mount is extended downwardly while the axle is mounted in the lathe, the cylindrical engaging roller will contact the axle journal portion $Ax5$ to gauge the depth of cut by the chamfer tool 84 on the outside corner $Ax2$ of the axle collar or button $Ax3$. The position of the tool mount in the vertical cross slide 81 is controlled by a hydraulic cylinder 85 containing a double-acting piston 86 which is attached to the tool mount 82 through a connecting rod 87.

The lower rail assembly $R_2$ will be described with particular reference to FIG. 21 and also FIGS. 7, 8 and 9.

This assembly comprises laterally spaced rails 88 which lie below the upper rails 1 and which cooperatively provide an axle storage surface for delivery of the burnished axles. The rails slope slightly downwardly from their ends 89 which are aligned adjacent to the path of the elevator saddle assembly previously described. Abutments 90 are located beneath and between the rails 88 to engage the pawls 20 and 20' of the elevator axle saddle assemblies 11 and 11' when they rise past the lower rails as described before. Going up the action is to dump the axle from the saddle assemblies onto the rails 88 and coming down the pawls merely lift and then return without moving the saddle assemblies. An escapement 91 controls axle delivery from the lower rails.

The burnishing machine assembly in a commercial form may also include appropriate accessories and refinements; for example, a spray system may be used to supply oil lubricant or coolant to the machining tools and parts.

The automatic machine assembly is controlled and powered by the combination of pneumatic, hydraulic and electrical systems.

Figure 22:
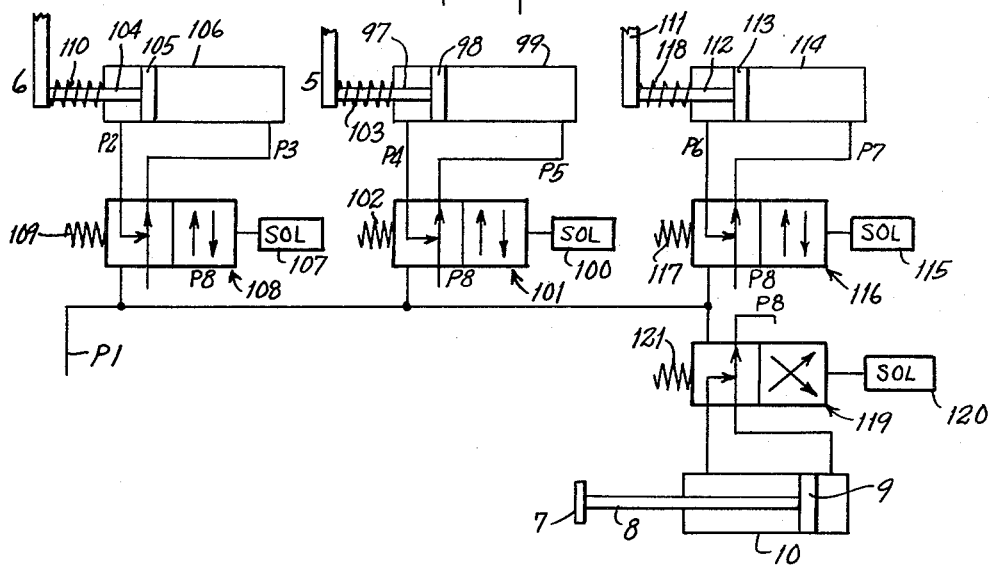
FIG. 22 is a pneumatic schematic diagram for the upper rail assembly, the axle positioner assembly, and the lower rail assembly of the burnishing machine.

A pneumatic system powers the operation of the escapements 3 and 4 of the upper rail assembly $R_1$ and the escapement 91 controlling axle delivery from the lower rail assembly $R_2$ and will be described with particular reference to the pneumatic schematic, FIG. 22.

Each escapement 3, 4 and 91, is operated in a similar manner, which will be described in explicit detail only for the second escapement 4 of the upper rails 1.

Compressed air is supplied to the system through a line $P_1$ by any suitable means.

A downwardly projecting arm 5 of the first or right hand upper escapement 3 is attached to the connecting rod 97 of a piston 98 in a pneumatic cylinder 99.

The escapement 3 is lowered to permit an axle to pass, by energizing a solenoid 100 which shifts a pneumatic valve 101 to its left hand position which connects the pneumatic supply line $P_1$ to line $P_4$ to power the left end of the cylinder 99. At the same time, the valve 101 connects a line $P_5a$ to line $P_8$ to allow the right hand side of cylinder 99 to exhaust.

The escapement 3 is raised when solenoid 100 is de-energized. A solenoid spring 102 shifts valve 101 to its right hand position which connects both lines $P_4$ and $P_5$ to line $P_8$. The cylinder is thus vented, at both ends, and a spring 103 powers the return stroke of the connecting rod.

In a similar manner, an escapement arm 6, of the escapement 4, is powered and controlled by a connecting rod 104, piston 105, cylinder 106, solenoid 107, valve 108, solenoid spring 109, and return spring 110, through lines $P_2$ and $P_3$. Likewise, escapement arm 111 for the escapement 91 on the lower rails, is powered and controlled by connecting rod 112, piston 113, cylinder 114, solenoid 115, valve 116, solenoid spring 117, and return spring 118, through lines $P_6$ and $P_7$.

The previously described axle positioner, which registers the axles for delivery to the elevator, is controlled by a pneumatic valve 119 having an actuating solenoid 120, for thrust control, and a return mechanism 121.

Figure 23:
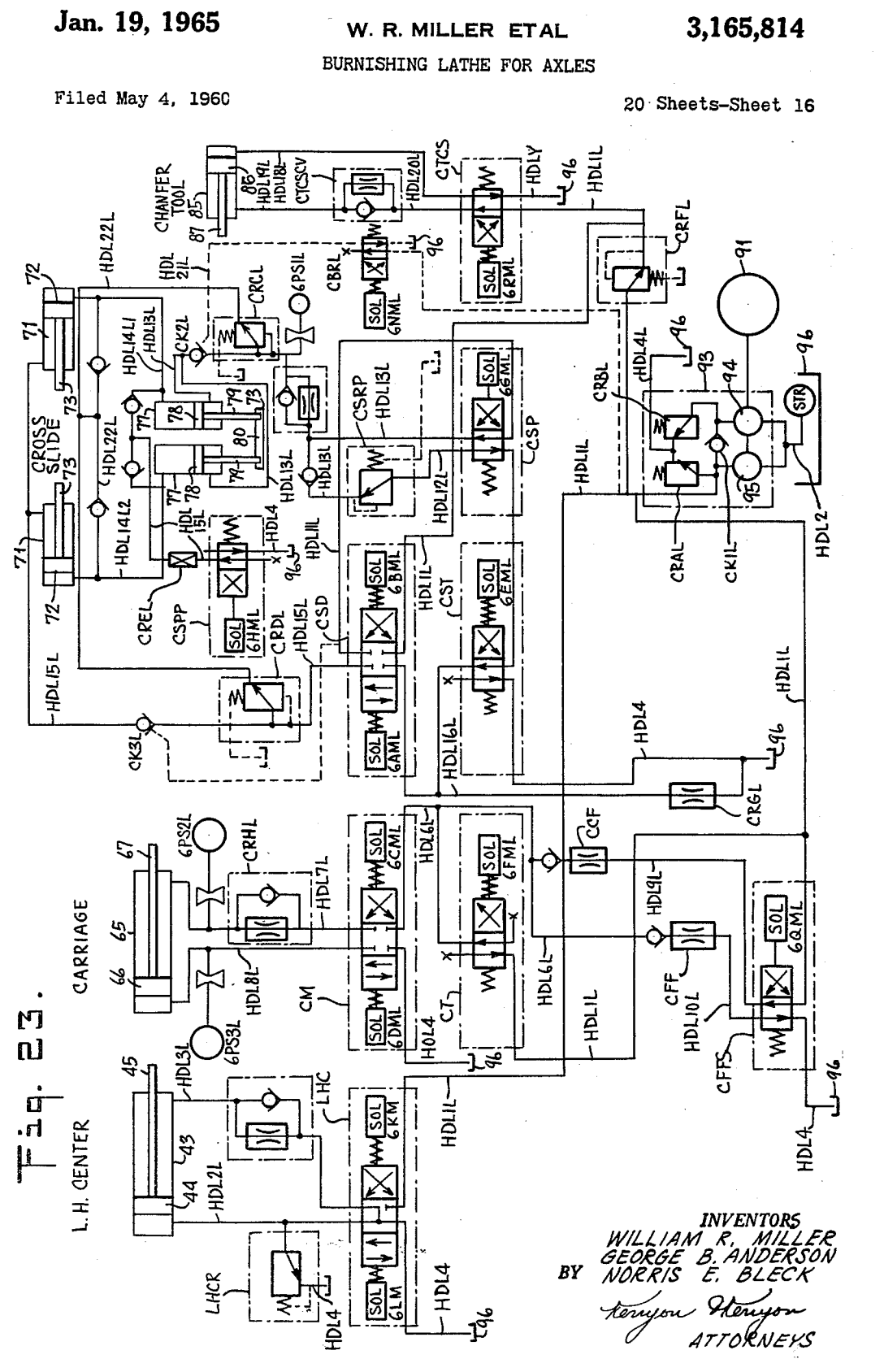

The hydraulic system, which operates both to control and power the burnishing lathe and elevator operations, consists of two similar but largely separate systems. The left hand system, shown in FIG. 23, is associated with the left hand chamfer assembly, carriage cross slide and the left hand center. The right hand system corresponds to the left hand system as to the right hand parts corresponding to the just named left hand parts, but it includes, in addition, the elevator control system shown by FIG. 24.

Each system is powered by pump assembly 93 having an oil supply tank 96 from which liquid feeds through strainer STR and hydraulic line HDL21.

The left and right systems correspond except where noted hereinafter and therefore both are disclosed largely by describing only the left hand system shown by FIG. 23.

Referring to FIG. 23, a motor 91 drives a low-pressure high-volume pump 94 and high-pressure low-volume pump 95. The high pressure pump is connected directly to the primary supply line HDL1L having a pressure relief valve CRAL which returns through hydraulic line HDL4L to the tank 96. The low pressure pump 94 is connected to the primary supply line HDL1L through a check valve CK1 and has a pressure relief valve CRBL also exhausting to tank.

The electrical control system of schematic FIG. 25 series, showing the general electrical circuitry, and FIG. 26, showing the circuitry especially associated with the elevator operation, must be understood in conjunction with understanding the other systems.

The physical locations of the power and control system components will generally be readily apparent to one skilled in the art, and so are shown by the mechanical drawings only when especially helpful to an understanding of the invention.

Referring to the schematic circuit of the FIG. 25 series, three phase alternating electric current powers the machine assembly through lines L1, L2 and L3. Lines L1 and L2 feed the primary of a voltage dropping transformer TR, the secondary feeding control or pilot circuit power lines CL1 and CL2.

Lines L1, L2 and L3 power the spindle motor 30 through normally open relay contacts SM. Solenoid "BRAKE," connected between lines L1 and L2, operates to release a spring loaded spindle brake while energized, this brake promptly stopping the spindle motor 30 when the solenoid is de-energized.

These lines L1, L2 and L3 also power the left hand hydraulic pump motor 91 through normally open contacts LHP.

The same lines L1, L2 and L3 power the right hand hydraulic pump motor 91a through normally open relay contacts RHP.

The above power lines power the lubricating oil pump motor 66 through normally open relay contacts LP.

The same lines power the right hand head adjusting screw motor 52 in a rotation direction to retract the tailstock through normally open relay contacts PF, and in a rotation direction to advance the tailstock toward the center of the lathe through normally open relay contacts PR.

Assuming the following conditions, which may be taken as the start of a cycle:

The upper rails 1 are empty, and therefore trip $3a$ is up and its limit switch 6LS5 is in its normal position, trip $4a$ is up and its limit switch 6LS1 is normal, and trip $4b$ is up and its limit switch 6LS3 is normal (FIG. 4);

The first escapement 3 is up, in its axle holding position;

The second escapement 4 is also up, and its limit switch 6LS2 is actuated;

The axle positioning plate 7 is retracted, and limit switch 6LS6, controlled by an abutment on connecting rod 18, is normal (FIG. 3);

The elevator E is down, and its spacing bar 12 is actuating limit switch 6LSM3, while limit switch 6LSM2 is normal;

The elevator saddle supports 18 are down, actuating limit switches 6LSM14L and 6LSM14R;

The left hand center 37 is retracted (to the left), and limit switches 6LSM11 and 6LSM18 are normal, while limit switch 6LSM12 is actuated (FIGS. 10 and 8);

The right hand head $H_2$ is retracted to the right and is actuating limit switch 6LSM1 (FIG. 9), the leaf spring 57 is unstrained and limit switch 6LSM4 is normal;

Both carriages 63 and 63' are positioned along their ways so that the burnishing tools supported by each will be generally opposite to the locations of the journals Ax5 and Ax5' of an axle Ax in the lathe; the left hand carriage is holding closed a normally open limit switch 6LSM6L, the right hand carriage is holding closed a normally open limit switch 6LSM6R; and limit switches 6LSM5L and 5R, 6LSM7L and 7R, 6LSM8L and 8R, 6LSM9L and 9R and 6LSM15L and 15R are normal;

The carriage cross slide tool holders are retracted; each left hand tool holder 70 holding closed a separate normally open limit switch 6LSM10L, and each right hand tool holder 70' similarly holding closed a 6LSM10R switch;

The chamfer cross slide tool holders are both retracted, the left holder 82 holding closed normally open limit switch 6LSM17L, and the right holder 82' similarly holding closed 6LSM17R;

The lower rails 88 are empty, and therefore trip 91a is up and its limit switch 6LS7 is normal. The escapement 91 is up.

The "stop everything" switch is closed (the position for normal operation).

The "start" switch is closed to activate the right and left hand hydraulic pump motor relays and the lubricating pump motor relay, previously referred to. Each of these relays is sealed in by closed normally open contacts RHP, LHP and LP respectively until positively released by the operation of the "stop" or "stop everything" switch.

The elevator E rises.

Solenoid 6JM is energized by a circuit from CL2 through limit switch contacts 6LSM12, 6LSM1, relay contacts 6US, 6LE and A1 to CL1. Unless explicitly mentioned, all control circuits will be between CL2 and CL1.

Limit switches 6LSM12 and 6LSM1 are closed at the start as described above.

The normally open contact of relay 6US is closed since relay 6US is energized through the normally open limit switch contacts 6LSM14L and 6LSM14R held closed as the start as described above, and relay contacts 6LE and A1 which form a part of the circuit energizing solenoid 6JM. Once energized, relay 6US is sealed in through a normally open contact 6US and the same relay contacts 6LE and A1.

The normally closed contact 6LE is closed since the circuit which could energize relay 6LE is open. That circuit is through relay contact 6E4 of a latch relay, limit switch contacts 6LS7 and 6LS2.

The normally open contact 6E4 is open since the relay 6E4 has been tripped open by energizing the trip coil through relay contact SM on the previous cycle, as will be described below. The relay will not have been latched closed, nor will it be latched closed as the elevator rises, since the normally open contact of limit switch 6LS3 will not be held closed since no axle will be delivered to the elevator during that period, nor will the manual recycle switch ordinarily have been depressed.

If the burnishing bypass switch is on, the machine will operate to remove axles from the upper rail assembly $R_1$ and place them on the lower rail assembly $R_2$. This will be accomplished by the elevator descending with an axle to the down position, as subsequently explained, and immediately rising to deliver that axle, since latch relay 6E4 will be tripped by a circuit through the burnishing bypass switch, limit switch contacts 6LSM3 and 6LSM2. The normally open contact of 6LSM3 is closed, and the normally closed contact of 6LSM2 is closed, when the elevator is down.

Alternatively, if the recycle switch is closed at this time, relay 6E4 will be latched, and, as subsequently explained, relay 6LE will be energized so that the elevator will not rise, but instead the axle will be rechucked between the lathe centers.

The normally open contact of relay A1 is closed as that relay was energized by an electric circuit through timer relay contact CST, and relay contacts 6MR, 6ML, the machine "start" switch and relay contacts CRL, CRR, RHP and LHP.

The delayed opening normally closed contact CST was closed since the timer relay CST was not energized because the circuit was open which could act to energize it through relay contacts PR, 6TS and either subcircuit "a" comprising 6LSR, A1, 6LE and either limit switches 6LSM3 and 6LSM2 or the burnish bypass switch and relay contact SM or subcircuit "b" using relay contacts 6RC and PR.

Subcircuit "a" was open as the normally open contact 6LE was open because relay 6LE was not energized as explained above.

By the time relay 6E4 will be latched to energize relay 6LE, through the normally open relay contact 6E4, and limit switch contacts 6LS7 and 6LS2, the elevator will have risen to allow the normally open contact of limit switch 6LSM3 to open, and so subcircuit "a" will remain de-energized until the elevator returns to its down position to again actuate limit switch 6LSM3.

Subcircuit "b" was broken, by normally open contact PR, which is open since the circuit which could energize relay PR, through relay contact PF, limit switch contact 6LSM1, delayed closing contact SST of relay timer SST, relay contacts 6LE, 6ML, 6MR, 6TS, "HOLD," SIM and A1, was open. For example, the right hand head housing 22' was holding normally closed limit switch 6LSM1 open. But in any event, relay CST can never be energized through subcircuit "b" since the normally closed and the normally open contacts of relay PR cannot both be closed at the same time.

The normally open contact of relay CRL was closed as that relay was energized by a circuit through relay contacts CPRL and 6ML. The normally open contact of relay 6ML was closed as that relay was energized through normally open limit switch 6LSM10L held closed by the cross slide tool holders 70 as described above, and the normally open contact of relay CPRL closed as the relay was energized through the normally open contact of limit switch 6LSM6L, held closed by the carriage 63 as described above.

The normally open contact of relay CRR was closed as this relay is energized by a circuit through relay contacts 6MR and CPRR. The normally open contact of relay 6MR was closed as the relay was energized through the normally open switches 6LSM10R, closed by the cross slide tool holders 70' as described above. The normally open contact of CPRR was closed as the relay was energized through the normally open contact of limit switch 6LSM6R, held closed by the carriage 63' as described above.

The contacts of relays LHP, and RHP remain closed as described above.

Once A1 is energized, together with A2, A3, and A4, it is sealed in by a normally open contact of relay A4 until the circuit through LHP and RHP is broken, as for example, by the "stop" switch, or the circuit through time delay opening contact CST is broken by the energization of relay CST for more than the time delay interval.

The relay may also be energized through the "cycle" switch, which bypasses the machine start switch and relay contacts CRL and CRR.

Figure 24:
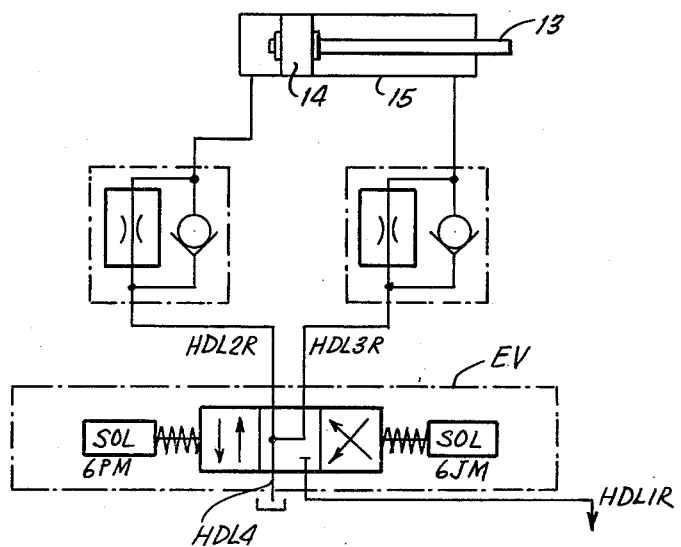
FIG. 24 is a hydraulic schematic diagram for the elevator which is a part of hydraulic circuitry for the carriage, carriage cross slide, and chamfer tool assembly cross slide associated with the right hand end of the burnishing lathe.

Energized solenoid 6JM operates to shift hydraulic directional valve EV, FIG. 24, to its left hand to connect hydraulic pump line HDL1R to hydraulic line HDL2R, and line HDL3R to line HDL4. Oil is supplied under pressure from pump 93' through HDL1R, valve EV, and HDL2R to the top or cap end of elevator cylinder 15. The piston 14 is powered to raise the elevator, and to exhaust oil in the bottom or rod end of the cylinder through HDL3R, valve EV, and HDL4 to the tank 96.

As the elevator rises, limit switch 6LSM3 is released and in its up position the elevator axle saddle support 18 actuates limit switch 6LSM2.

Axles Ax to be burnished may be delivered to the outer or upper ends of the upper rails 1 by an convenient method. Preferably the axles are roughly aligned, when delivered, so that they will tend to be slightly displaced from the center of the elevator saddle supports 18 and 18' toward the axle positioner P when they have rolled against the last escapement 4.

An axle, delivered to the upper rails, first rolls down them to be restrained either by the first escapement 3 or by previously delivered axles retained behind it. Thus the upper rail provides for storing a supply or collection of axles.

The first escapement 3 rotates to release one axle provided (a) an axle has been brought to rest against it, (b) the second escapement 4 is empty, that is to say, there is no axle being restrained by it, and (c) the second escapement is up.

Solenoid 6CBD is energized through relay contacts A1 and 6E1, and limit switch contacts 6LS1 and 6LS2.

Relay contact A1 remains closed as previously described.

The normally open contacts of relay 6E1 are closed as that relay is energized by a circuit through limit switch contacts 6LS5, 6LS1, and 6LS2. Once energized the relay is sealed in by limit switch contact 6LS5 by a normally open contact 6E1.

Normally open contact of limit switch 6LS5 is closed as that limit switch is actuated by an axle, retained by the first escapement, which depresses trip 3a.

The normally closed contact of limit switch 6LS1 remains closed, since there is no axle retained by the second escapement 4 to depress the second trip 4a.

The normally open contact of limit switch 6LS2 is held closed by the second escapement 4 which is in its up or axle retaining position.

Energized solenoid 6CBD actuates the pneumatic valve 101 which operates the pneumatic cylinder 99 to lower escapement 3 as explained above.

The axle Ax released from the first escapement 3 rolls down rails 1 to be retained by the second escapement 4, thus releasing the first trip 3a and depressing the second trip 4a.

The first escapement 3 returns to its up axle restraining position. This results as soon as the axle A contacts and depresses the second trip 4a which actuates limit switch 6LS1 to open its normally closed contact. This de-energizes pneumatic valve 101 which is returned to its normal position by spring 102 allowing spring 103 to return escapement 3 to its up position as explained above.

The end plate 7 of axle positioner P advances to move the axle Ax, which is restrained by the second escapement 4, into position for later registered release onto the elevator saddle supports 18.

Solenoid 6CBE (120) is energized through contacts A1, 6E3, 6E2 and 6E4.

Normally open relay contact A1 remains closed as described above.

Normally closed contact 6E3 is closed since the circuit which could energize relay 6E3 is opened by normally open contact 6LS6 which is open since the end plate positioner 7 has not extended to actuate limit switch 6LS6 since relay 6E4 was last energized as described below.

Normally open relay contact 6E2 is closed since relay 6E2 is energized through normally open limit switch contact 6LS1 and relay contact 6E4. Limit switch 6LS1 is actuated as described just above.

Normally closed contact 6E4 remains closed, as described above.

Energized solenoid (120) 6CBE actuates a pneumatic valve 119 which controls the pneumatic cylinder 10 to move the end plate positioner 7 forwardly, in a manner similar to that which operates the rail escapements.

The end positioner continues to move forwardly positioning the axle until limit switch 6LS6 is actuated, closing the normally open contact so that the end positioner retracts.

Closing the normally open contact of 6LS6 energizes relay 6E3 through contact 6LS6 and relay contact 6E4, which remains closed as described above. Once energized, the circuit to relay 6E3 is sealed in around contact 6LS6 by normally open contact 6E3 until solenoid 6E4 is latched.

Energizing relay 6E3 opens its normally closed contact and breaks the circuit energizing solenoid 6CBE. De-energizing solenoid 6CBE allows the axle positioner to retract, under the pressure of a connecting rod spring 121.

Escapement 4 lowers to release the axle Ax.

Closing the normally open contact of limit switch 6LS6 energizes relay 6E3 as just described. Closing the normally open contact of relay 6E3 completes the circuit energizing solenoid 6CBF through limit switch contact 6LSM2, and relay contacts CS1, 6E3, 6E2, and 6E4.

Normally open limit switch 6LSM2 is held closed by the elevator saddle support 18 since the elevator is in its up position.

Normally open relay contact CS1 is closed as relay CS1 is initially energized through relay contacts 6LSR, the machine "start" switch, relay contacts CRL, CRR, RHP and LHP.

The normally closed contact of relay 6LSR is closed since the circuit energizing relay 6LSR was broken by normally open limit switch 6LSM4 which was open when the "start" switch was closed, since the right hand head was not exerting working pressure against an axle in position between centers 37 and 37' and driver plates 29 and 29'.

Relay contacts CRL, CRR, RHP and LHP were closed as previously described.

Once energized, relay CS1 may be sealed in past the machine start switch and relay contacts CRL and CRR by normally open relay contact CS1 being closed and the "cycle on-off switch" being in the "on" position. If the "cycle on-off" switch is "off," the machine "start" switch must be held closed at this time, or the "cycle" switch must be closed, to energize relay CS2 through relay contact 6LSR and relay contacts CRL, CRR, RHP and LHP for the second upper escapement to lower. Once energized relay CS2 is sealed around contact 6LSR and "cycle" switch, etc.

Normally open relay contact 6E3 is closed as just described.

Normally open relay contact 6E2 remains closed as described above.

Normally closed relay 6E4 remains closed as described above.

Energized solenoid 6CBF (107) operates pneumatic valve 108 which controls pneumatic cylinder 106 to lower escapement 4, as explained above.

Now it can be seen that the second escapement 4 lowers to release an axle only after the axle positioner has operated, and (a) the elevator is up, (b) an axle is being retained behind the second escapement 4, (c) an axle has not yet been delivered to the lathe in the current cycle, and (d) either the machine is set to cycle or is manually controlled to operate on another single cycle.

The axle Ax rolls down the upper rails off the second upper trip 4a, over the third upper trip 4b, and on to the elevator saddle supports 18.

The second escapement rises to its up position.

As the third upper trip 4b momentarily is depressed the normally open contact of relay 6LS3 is momentarily closed to energize and latch relay 6E4, which will remain latched until the trip coil of relay 6E4 is energized, as will be described later. Energized relay 6E4 opens its normally closed contact 6E4 which de-energizes solenoid 6CBF (107) allowing solenoid actuated pneumatic valve 108 to permit escapement 4 to return to its up position as explained above.

Escapement 3 again lowers, an axle rolls down rails 1 to be retained by escapement 4 while resting upon and depressing the second upper trip 4a. Solenoid 6CBD (100) was energized to lower the escapement through relay contacts A1, 6E1, and limit switch contacts 6LS1 and 6LS2 as described before and, after the axle is released, is de-energized to raise the escapement, also as described before.

Elvator E lowers carrying the axle.

Solenoid 6JM controlling hydrualic valve EV in one direction (to raise the elevator) is de-energized by the opening of the normally closed relay contact of 6LE. Relay 6LE is energized through relay contact 6E4, and limit switch contacts 6LS7 and 6LS2. The normally open contact 6E4 has just been closed by latching relay 6E4 as described above. The normally closed contact of limit switch 6LS7 is closed if the lower rails 88 have room to accept another axle burnished axle, which occurs if the lower rails have less than a predetermined number of axles retained behind escapement 91. The normally open contact of limit switch 6LS2 is closed since the second escapement 4 is up, as previously described.

Solenoid 6PM (controlling hydraulic valve EV in the other direction to lower the elevator) is energized through relay contacts A1, 6LE, and limit switch contact 6LS3.

Relay contacts A1 and 6LE are closed as previously described.

The normally closed contact of limit switch 6LS3 was closed when the axle left the upper rails 1 to release the momentarily depressed third upper trip 4b.

Energized solenoid 6PM lowers elevator E by moving hydraulic directional valve EV to its right hand position to connect the pump line HDL1R to the line HDL3R to power the rod end of the cylinder 15 and lower the elevator. At the same time, line HDL2R is connected through line HDL4 to the tank 96 to permit the lowering of piston 14.

The elevator E carrying the axle Ax lowers below the lathe axle supports 22 which engage the axle on the previously machined surfaces of the wheel seats Ax9, to accurately hold and position it between, but slightly below, the lathe centers 37 and 37'.

The elevator E continues down, providing clearance between the saddle supports 18 and the axle Ax, until it is fully retracted or lowered. In this position, the elevator spacing bar 12 actuates limit switch LSM3.

The axle is chucked between the left hand center 37 and the right hand center 37' as the left hand center, moving by itself from its head and the right hand center, moving with the right hand head H$_2$, moves toward the center of the lathe, and the respective center holes Ax1 in the axle Ax.

Solenoid 6KM (associated with the left hand center 37) is energized through relay contacts 6TS, 6LSR, A1, 6LE, and limit switch contacts 6LSM3 and 6LSM2. The alternative energizing circuit through relay contacts 6TS, 6RC, and PR is now opened by the normally open contact PR which is open as the circuit to PR is opened by the normally closed contact of relay 6LE, relay 6LE is energized as described above.

The normally open contact 6TS is closed since the relay 6TS is energized through normally open contacts of limit switches 6LSM17L and 6LSM17R, which remain held closed by chamfer tool holder mounts 82 and 82' as described above.

The normally closed contact 6LSR is closed since the circuit to relay 6LSR through limit switches 6LSM18 and 6LSM4 is opened by the normally open limit switch contact 6LSM4 as described above.

The normally open relay contacts A1 and 6LE remain closed as described above.

The normally open contact of limit switch 6LSM3 is held closed by the elevator spacing bar, as just described above.

The normally closed contact of limit switch 6LSM2 is closed, since the elevator spacing bar 12 has lowered from the upper rail ends 2.

Energized solenoid 6KM extends the left hand center 37 by moving hydraulic valve LHC (FIG. 23) to its left hand position to connect pump line HDL1L to line HDL2L which connects to the cap or closed end of hydraulic cylinder 43 to power piston 44, connecting rod 45, cross head 41, tension rod 40 and thereby push center 37 to the right. The pressure in line HDL2L is limited by pressure relief valve LHCR which can bypass incoming oil through HDL4 to tank 96. Valve LHC also connects line HDL3L to line HDL4 to allow the piston 44 to exhaust the oil in the rod end of the piston to tank 96.

The right hand head H$_2$ carrying the right hand center 37' moves in when relay PF is energized through relay contacts CST, PR and the above circuit which by itself energized solenoid 6KM.

While solenoid 6KM is energized relay solenoid CST is energized and its normally open contact CST is closed if contact PR is closed.

The normally closed contact of relay PR is closed since the circuit is open which could energize relay PR through relay contact PF, limit switch contact 6LSM1, timer relay contact SST, relay contacts 6LE, 6ML, 6MR, 6TS, "HOLD," SIM and A1.

The normally closed contact of limit switch 6LSM1 is initially held open by the housing 22' of the right hand head, as described above.

Relay PF is therefore energized, and since the normally closed contact of relay PF opens before the right hand head moves sufficiently to allow limit switch contact 6LSM1 to close, relay PR will remain de-energized and its normally closed contact PR closed at least until relay PF is de-energized by opening that portion of the circuit which is common to solenoid 6KM.

Relay PR will not then be immediately energized since the normally closed contact 6LE is open, since relay 6LE remains energized as described above.

Energized relay PF operates the adjusting screw motor 52 to force the right hand adjusting screw 23' and its left hand end 56 against leaf spring 57 to move the right hand head H$_2$ toward the left and center of the lathe.

The left hand center 37 and the right hand center 37', together with the right hand head, continue to move in toward the axle until the center ends 38 and 38' enter the upper portion of the axle center recesses Ax1 so as to lift the axle with cam-like action until the center ends are completely seated in the axle centers and the axle thus securely centered.

The right hand center and drive plate 29' carried by the right hand head continue forward toward the center of the lathe forcing the left hand center to retract until the left hand axle end encounters the left hand drive plate 29 and the springs 39 and 39' urging the centers 37 and 37' outwardly have compressed as required during this operation to permit their respective centers to retract sufficiently to allow the axle to be firmly gripped between the left and right hand drive plates 29 and 29'.

As the left hand center retracts, the piston 44 of cylinder 43 is moved to the left. The oil between it and the cap end of the cylinder is exhausted through line HDL2L, pressure relief valve LHCR (FIG. 23), and line HDL4 to tank 96. The rod end of the cylinder prefills from the tank 96 through line HDL3L, valve LHC, and line HDL4.

The end of the right hand adjusting screw 56, continues to increase the pressure on the drive collars frictionally gripping the axle until the leaf spring 57 transmitting this pressure has deflected sufficiently to actuate limit switch 6LSM4.

Solenoid 6KM controlling hydraulic valve LHC in one direction and relay PF are de-energized as the normally closed contact 6LSR opens.

Relay 6LSR is energized through limit switch contacts 6LSM18 and 6LSM4. The normally closed contact of 6LSM18 is closed since cross head 41 of the left hand head is retracted. The normally open contact of limit switch 6LSM4 is held closed by the deflection of leaf spring 37, as just described.

De-energized solenoid 6KM allows a spring to return valve LHC to its center position, capping line HDL1L and connecting each end of cylinder 43 to tank 96 through lines HDL3L, HDL2L, and HDL4.

De-energized relay PF halts the adjusting screw motor 52, leaving the axle firmly held for subsequent burnishing operations.

Some regular time interval will ordinarily be occupied by thick chucking operation—that is to say from the time the solenoid 6KM and the relay PF are first energized until the limit switch 6LSM4 has been actuated. If this time for operation is approximately 18 seconds, a safety limit of 22 seconds might be selected and the normally closed delayed opening contact of the timer relay CST provided to stop the machine cycle if the limit switch 6LSM4 is not contacted within that safety time limit to indicate that the axle has been normally chucked in position between the lathe centers.

The cycle is stopped in this manner, it may ordinarily be restarted by closing "start" switch or the "cycle" switch as described above.

Relay CST is initially energized at the start of the chucking operation, as described above. If it is not de-energized in the time alloted, the normally closed delayed opening contact CST opens, relay A1 is de-energized and the machine stops.

The left and right pairs of burnishing tools 74 and 74' are operated in a similar manner although not necessarily simultaneously, by means of the left and right carriages 63 and 63' and the left and right cross slide tool holders 70 and 70". For clarity and brevity these operations will be described only with detailed reference to the left hand carriage assembly $C_1$.

When the axle is chucked, the left hand carriage 63 moves at traverse speed to the left from its start position until it approaches and actuates limit switch 6LSM8L.

Referring to the electric schematic diagram, FIG. 25, a twelve position and 20 contact rotary switch is in start position, identified as position 1, to which it was advanced at the end of the previous cycle. The switch is now advanced to position 2 as the rotary solenoid RS is energized through a circuit from line CL2 through step switch interrupter contact 1, relay contacts 6LE, 6LSR, and step switch contact 2 to lines CL1.

The interrupter contact 1 is closed when the step switch is in position 1, and is also closed when the step switch is in each of the other eleven switch positions, as indicated on the schematic diagram by an "X" opposite the contact 1 for each of those positions.

The normally open relay contact 6LE is closed and normally open 6LSR is closed, both as described above.

Step switch contact 2 is closed in step switch position 1.

Solenoid 6DML is now energized from line CL2 through limit switch 6LSM7L, relay contact A3, and step switch contact 14 to line CL1. The normally closed contact of limit switch 6LSM7L is closed, as at the start. The normally open contact of relay A3 is closed since that relay remains energized as described above.

Energized solenoid 6DML shifts valve CM to its right hand position to connect line HDL6L to line HDL7L and line HDL8L to line HDL4.

Solenoid 6FML is energized from line CL2 through relay contact A3, step switch contact 15, and limit switch contact 6LSM8L to line CL1. The contact A3 is closed as just described, and step switch contact 15 is closed in switch position 2. The normally closed contact of limit switch 6LSM8L remains closed as at the start.

Energized solenoid 6FML shifts valve C7 to connect line HDL1L to line HDL6L.

Hydraulic pump 93 delivers oil through HDL1L, valve CT, line HDL6L, valve CM, and line HDL7L to the rod end of hydraulic cylinder 65. This powers the piston 66 to move connecting road 67 and the carriage 63 to the left at traverse speed. The oil that is in the cap end of cylinder 65 is exhausted through line HDL8L, valve CM and line HDL4L to tank 96.

Upon actuating limit switch 6LSM8L the carriage slows to continue to the left at the fast feed speed, and continues to actuate that limit switch. (FIGS. 16 and 17). In commercial practice, of course, suitable engagement means may be fastened to the carriage 63 to actuate such a limit switch when the carriage is located in an appropriate position along its guideways.

Solenoid 6FML of aforementioned hydraulic directional valve CT is de-energized where the normally closed side of limit switch 6LSM8L opens. This permits valve CT to be moved to its right hand position by a spring to cap line HDL1L and line HDL6L.

Solenoid 6QML remains de-energized since the normally open contacts of relay 6FL are open because the relay remains de-energized from the start of the cycle until contact 6T1L closes as described below, and since 6M7 also remains de-energized until the carriages actuate limit switches 6LSM7L and 6LSM7R as described below.

De-energized solenoid 6QML allows a spring to maintain valve CFFS in its right hand position line to connect line HDL1L to HDL9L which is connected through hydraulic flow control valve CCF to line HDL6L.

The hydraulic pump 93 continues to power oil through line HDL1L which can now flow on through valve CFFS, line HDL9L, and flow control valve CCF to line HDL6L. The remaining oil flow remains as described above for the traverse speed movement of the carriage and the piston 66 therefore moves the carriage to the left as before, except at the slower fast feed rate determined by flow control valve CCF.

Continuing to the left, the carriage actuates limit switch 6LSM9L but without effect at this time since the normally closed contact 6LSM9L is opened in a circuit which was previously opened without effect by the normally closed contact 6CL. Relay 6CL is in parallel with solenoid 6DML and hence was energized with it, also without immediate effect because step switch contact 5 is open and energizing solenoid 6MHL has no significant effect at this time as will become apparent from following discussion.

The carriage continues to the left until the burnishing tools 74 are opposite the left hand portion of the axle collar surface $Ax3$, and in that position actuates limit switch 6LSM7L, and consequently stops.

Solenoid 6DML is de-energized as the normally closed contact of limit switch 6LSM7L opens and allows valve CM to be returned by spring action to its center position in which both ends of carriage hydraulic cylinder 65 are capped through lines HDL7L and HDL8L. Piston 66 is thereby held stationary in cylinder 65.

Spindle motor 30 starts, control line CL4 is energized, latch relay 6E4 is tripped, and the rotary switch steps to position 3 which causes the cross slide tool holders 70 to move the burnishing tools in toward the axle.

The spindle motor relay SM is energized through relay contacts 6LSR, A1, 6TS and 6M7.

Relay contacts 6LSR and A1 remain closed as described above.

The normally open relay contact 6TS is closed as that relay is energized through limit switch contacts 6LSM17L and 6LSM17R which are held closed by the retracted chamfer tool holder mounts 82 and 82' respectively.

The normally open contact 6M7 is closed as that relay is energized through limit switch contacts 6LSM7L and 6LSM7R. The normally open limit switch contact 6LSM7L is held closed by carriage 63 as just described and limit switch contact 6LSM7R is held closed in a similar manner by the right hand carriage 63'.

The relay SM was not previously energized during the current cycle because the normally closed contacts 6MR and 6ML have been open, since their relays have been energized as described above. One or both will subsequently complete the circuit to relay SM and ensure that relay SM remains energized until both pairs of carriage cross slide tool mounts 70 and 70' are completely retracted to signal the completion of the burnishing and chamfering portion of the cycle.

When relay SM is energized, its normally open contacts close to operate the spindle motor 30 to energize relay SIM, and trip relay 6E4.

A normally closed contact SIM therefore opens to prevent the relay PR from becoming energized and to thereby prevent the operation of the right hand head adjusting screw motor 52 to retract the right hand head.

Another normally open contact of energized relay SIM also closes to energize control line CL4.

Latch relay 6E4 is tripped because the trip solenoid is energized when another normally open contact of relay SM closes.

The solenoid of the step switch is energized from line CL2 through closed interrupter contact 1, step switch contact 3, and relay 6M7.

The step switch contact 3 is closed in step switch position 2.

The normally open contacts of relay 6M7 are closed, as just described above.

The cross slide tool holders 70 feed in on the carriage cross slide toward the axle until the burnishing tools 74 contact the railroad axle collar Ax3 under low pressure.

Solenoid 6AML is energized from line CL2 through relay contact A3 and step switch contact 16, closed in step switch position 3, to line CL4. The normally open relay contact A3 is closed and line CL4 is energized, as explained above.

Solenoid 6GML is energized from CL2 through closed normally open contact A3 and step switch contact 18, closed in position 3, to line CL4.

Solenoid 6EML is energized from line CL2 through closed relay contact A3 and step switch contact 17, closed in position 3, to line CL1.

Energized solenoid 6AML moves valve CSD to its right hand position to connect line HDL1L to line HDL11L and to connect line HDL15L to line HDL16L.

Energized solenoid 6GML moves valve CSP to its left hand position to connect line HDL11L to line HDL12L and to cap line HDL13L.

Energized solenoid 6EML shifts valve CST to its left hand position to connect line HDL16L to line HDL17L.

Pump 93 powers oil through line HDL1L, valve CSD, line HDL11L, valve CSP, line HDL12L, the low pressure control valve CSRP and line HDL13L into the rod ends of synchronizing hydraulic cylinders 77 through a T connection in line HDL13L. Pistons 78 are forced toward the cap end of the cylinders 77, moving synchronously because their connecting rods 79 are rigidly joined by cross head 80. The oil in the cap end of cylinders 77 is therefore exhausted in equal measured quantities through line HDL14L1 and HDL14L2 to the cap ends of cross slide cylinders 71, to power pistons 72 which move connecting rods 73 and thereby cross slide tool holders 72 in toward the axle. Oil is exhausted from the cap ends of cylinders 71 through line HDL15L, valve CSD, line HDL16L, valve CST and line HDL4 to tank 96.

As the burnishing tools together, or either one by itself, encounters the axle collar Ax3, pressure immediately begins to build up in line HDL13L. This pressure causes pressure controlled valve CRCL to operate to connect line HDL13L to line HDL22L. Oil from HDL13L can then bypass the synchronizing cylinders 77 and flow directly to the cap end of cross slide cylinders 71 through valve CRCL, line HDL22L and lines HDL14L1 and HDL14L2 to eliminate any possibility of forcing the burnishing tools 74 against the axle with unequal pressure. Check valve CK2L prevents synchronizing cylinder pistons 78 from drifting away from their previously achieved locations in the cylinders 77. This pressure equalizing system is operable every time the burnishing tools are forced against the axles.

With both burnishing tools 74 contacting the axle collar Ax3, pressure continues to build up in line HDL13L until pressure switch 6PS1 is closed, causing the step switch to advance and the carriage to fine feed to the right.

The rotary step switch advances to position 4 as the solenoid is energized from line CL2 through interrupter contact 1, step switch contact 4 closed in position 4, and the normally open pressure switch contact 6PS1L, which is now closed as just described.

In position 4, the step switch continues to energize solenoid 6AML, 6GML, and 6EML. The circuitry for each remains the same.

The left hand carriage 63 fine feeds to the right.

The solenoid 6MCL of hydraulic valve CM is energized from line CL2, through limit switch contact 6LSM15L, relay contact A3, step switch contact 19, and timer relay contact 6T4L.

The normally closed contact 6LSM15L is closed since that limit switch is actuated by carriage 63 only when the burnishing tools are opposite to the inner end of the wheel seat surface Ax9.

The normally open relay contact A3 is closed as described above, and the step switch contact 19 is closed in position 4.

The normally closed delayed opening contact of time relay 6T4L is closed since that relay is de-energized by normally open delayed closing contact 6T2L which is open since relay 6T2L has not yet been energized by normally open delayed closing contact 6T1L which is open since relay 6T1L is not yet energized by normally open contact 6PS3L of electrically operated pressure switch 6PS3L which has not yet operated during the cycle since there has been inadequate pressure build up in hydraulic line HDL8L.

Energized solenoid 6CML shifts hydraulic directional valve CM to its left hand position to connect line HDL6L to line HDL8L and line HDL7L to line HDL4.

At the same time, solenoid 6QML is energized from line CL2 through relay contacts T5L and 6M7 to line CL1.

Normally closed instantaneous acting contact of timer relay limit T5L is closed since that relay has not yet been energized through the "wheel seat control" contact, limit switch contact 6LSM5L and electric pressure switch contact 6PS3L. The normally open contact of limit switch 6LSM5L and the normally open contact of electric pressure switch 6PS3L will not be closed at the same time until the burnishing tools contact the axle shoulder Ax8 to stall the carriage as described below.

The normally open relay contact 6M7 remains closed since relay 6M7 remains energized, until the carriage moves to the right, through limit switches 6LSM7L and 6LSM7R, as described above. The circuit is sealed in from line CL2 through contact T5L, a normally open contact of relay 6QML, and limit switch contact 6LSM8L. The normally open contact 6LSM8L is held closed by the left hand carriage, since that limit switch remained actuated by the carriage 63 since first contacted as described above.

Energized solenoid 6QML shifts hydraulic valve CFFS to its left hand position to connect line HDL1L to line HDL10L and line HDL9L to tank 96.

The hydraulic pump 93 continues to power the hydraulic cylinders 71 to maintain low pressure on the burnishing tools 74, as described above.

Pump 93 also delivers oil through line HDL1L, valve CFFS and line HDL10L, to hydraulic control valve CFF, which limits the flow of oil to that required to move the carriage at a fine or slow feed, and connects line HDL10L to line HDL6L, valve CM and line HDL8L to power the cap end of cylinder 65 and cause the carriage to fine feed toward the right. The oil in the rod end of cylinder 65 is exhausted by piston 66 to line HDL7L, hydraulic directional valve CM and line HDL4 to the tank 96.

As the carriage fine feeds to the right, limit switch 6LSM7 is released. The normally open contact 6LSM7 opens to de-energize relay 6M7, but without any immediate effect since previously energized relay 6QML is now sealed in around contact 6M7 as described above.

The carriage continues in fine feed to the right, releasing limit switch 6LSM9L which remained actuated since first contacted as described above. Pressure on the burnishing tools, which are now in contact with the right end of axle collar surface Ax3, is gradually released.

The rotary step switch is advanced to position 5. The step switch solenoid RS is energized from line CL2 through interrupter contact 1, step switch contact 5, limit switch contact 6LSM9L, and relay contact 6CL.

Step switch contact 5 is closed in position 4.

The normally closed contact 6LSM9L is closed, since that limit switch has just been released as described above.

The normally closed contact of relay 6CL is closed since that relay is connected in parallel with solenoid 6DML and was therefore de-energized with that solenoid.

In position 5, the rotary step switch continues to energize solenoid 6EML, 6GML and 6CML through the same circuitry, as step switch contacts 17, 18 and 19 remain closed in step switch position 5.

Solenoid 6AML is de-energized by step switch contact 16, which is open in position 5.

De-energized solenoid 6AML allows hydraulic directional valve CSD to be returned by spring pressure to its center position thus capping lines HDL1L, HDL11L, HDL15L, and HDL16L, to cut off the oil supply for maintaining pressure on the burnishing tools.

At the same time, solenoid 6HML is energized from line CL2 through limit switch contact 6LSM9L and relay contact 6CL to line CL1.

The normally closed contact of limit switch 6LSM9L is closed and the normally closed relay contact 6CL is closed, as described above.

Energized solenoid 6HML moves hydraulic valve CSPP to its right hand position to connect line HDL15L which incorporates a flow controlling needle valve CREL, to line HDL4 which connects to the tank 96.

The pressure in hydraulic cross slide cylinders 71 and on their pistons 72 is released as the oil in the cap ends bleeds through lines HDL14L1 and HDL14L2, line HDL15L and flow valve CREL, valve CSPP and line HDL4 to tank 96.

The carriage continues in fine feed to the right until limit switch 6LSM8L is released, to cause the carriage to stop and the cross slide to move in to contact the axle journal surface Ax5 near the left hand shoulder Ax4 at high pressure.

The step switch advance to position 6. The rotary solenoid is energized through interrupted contact 1, step switch contact 6 which is closed in step switch position 5, and normally closed limit switch contact 6LSM8L, which is closed since that limit switch has just been released as described above.

The carriage 63 stops.

Solenoid 6CML is de-energized by step switch contact 19 which opens in step switch position 6. The normally open contact of relay 9CL is also open, as that relay has not yet been energized by timer relay 6TL, as is described below.

De-energized solenoid 6CML allows hydraulic valve CM to return by spring pressure to its center position, thus capping hydraulic lines HDL6L, HDL7L, HDL8L, and HDL4. Oil flow to or from the carriage hydraulic cylinder 65 is halted, so piston 66 and thereby the carriage are held in a fixed position.

The cross slide tool holders carry burnishing tools 74 in against the axle journal Ax5 and maintain them in contact under high pressure.

Solenoid 6GML is de-energized by step switch contact 18, which is open in step switch position 6.

The de-energized solenoid 6GML allows hydraulic valve CSP to return to its right hand position by spring pressure to connect line HDL11L to line HDL13L and to cap line HDL12L.

Solenoid 6AML is energized as previously described, step switch contact 16 being reclosed when the step switch is in position 6.

Energized solenoid 6AML moves hydraulic directional valve CSD to its right hand position to connect line HDL1L to line HDL11L and line HDL15L to line HDL16L.

Solenoid 6EML remains energized in step switch position 6, and continues to operate valve CST as described above.

Pump 93 powers oil through line HDL1L, valve CSD, line HDL11L and valve CSP to line HDL13L through which the oil flows to press the burnishing tools against the axle through the same circuit as previously described. At the same time, lines HDL14L1 and HDL14L2 are slowly bled through line HDL15L and needle valve CREL, hydraulic valve CSPP and line HDL4 to tank 96. The pump supply overpowers the bleeding circuit and pressure builds up in line HDL13L to actuate electrical pressure switch 6PS1L causing the step switch to advance and the carriage to fast feed to the left.

The rotary step switch advances to position 7. The rotary solenoid is energized through interrupter contact 1, step switch contact 7, which is closed when the step switch is in position 6, and the normally open contact of electrical pressure switch 6PS1L, which is closed as just described.

In position 7, the step switch continues to energize solenoids 6AML and 6EML, since step switch contacts 16 and 17 remain closed.

The bleeding of hydraulic lines HDL14L1 and HDL14L2 is stopped.

Solenoid 6HML is de-energized as the normally closed contact of the relay 6CL opens as relay 6CL is energized from line CL2 through limit switch contact 6LSM7L, relay contact A3, and step switch contact 14 to line CL1. Normally closed limit switch contact 6LSM7L remains closed, as above, since the carriage is not at its extreme left hand position. Normally open relay contact A3 remains closed as above. Step switch contact 14 is closed in step switch position 7.

De-energized solenoid 6HML allows hydraulic valve CSPP to return to its left hand position by spring pressure to cap the bleeding line HDL15L. The pressure in lines HDL14L1 and HDL14L2 and therefore in the cap ends of the cross slide tool holders' hydraulic cylinders 71 increases to the full high pressure. This pressure may be reduced and regulated as desired by a hydraulically operated pressure control valve CRFL which may be incorporated, in that portion of the primary pump supply line HDL1L which supplies oil to power the carriage cross slide hydraulic cylinders 71.

Carriage 63 moves at fast feed to the left toward the shoulder Ax4 between the axle journal Ax5 and the axle collar Ax3 of larger diameter.

Solenoid 6DML is connected in parallel with relay 6CL and energized with it as described above.

Solenoid 6QML was de-energized when limit switch 6LSM8L was released as described above to allow normally open contact 6LSM8L to open breaking the seal in the circuit around contact 6M7. That normally open contact is also open, since relay 6M7 remains de-energized by limit switch contact 6LSM7L as explained above. An alternative circuit through relay contacts 6FL and 6ML to line CL4 is not yet closed, as is described below.

Energized solenoid 6DML shifts hydraulic directional valve CM to its right hand position connecting line HDL6L to line HDL7 and line HDL8L to line HDL4.

De-energized solenoid 6QML allows hydraulic valve CFFS to return by spring pressure to its right hand position to connect hydraulic line HDL1L to line HDL9L and line HDL10L to line HDL4 and the tank 96.

Hydraulic pump 93 powers through line HDL1L, hydraulic directional valve CFFS, line HDL9L, hydraulic flow control valve CCF, line HDL6L, valve CM, line HDL7L, to the rod end of the carriage hydraulic cylinder 65 to power the carriage at fast feed to the left. The oil at the cap end of the carriage hydraulic cylinder 65 is exhausted through HDL8L, valve CM, and line HDL4 to tank 96.

As the carriage 63 moves to the left, it actuates and holds closed limit switch 6LSM8L, but without effect at this time.

The carriage continues to the left until the burnishing tools 74 stall by pressing against the collar shoulder Ax4. Feed pressure builds up in line HDL8L to actuate electric pressure switch 6PS2L and to press the burnishing tools against the shoulder. The tools dwell for a short time against the shoulder to burnish it.

After the time interval of the dwell period, the step switch advances to position 8 and the carriage fast feeds to the right, across the axle journal surface Ax5.

The step switch advances to position 8 as mentioned above. The rotary solenoid is energized from line CL2 through interrupter contact 1, timer relay contact 6T3L, electric pressure switch contact 6PS2L and limit switch contact 6LSM8L to line CL1.

The normally open contact of timer 6T3L closes at a predetermined interval after the timer relay has been energized through relay contact 6TL, electric pressure switch contact 6PS2L and limit switch contact 6LSM8L. The normally closed contact of relay 6TL is closed as that relay is de-energized by a normally open contact of timer relay T5L which remains open as described above.

The normally open contact of electric pressure switch 6PS2L is closed when the switch is actuated as described above.

The normally open contact of limit switch 6LSM8L remains closed, as described above.

The carriage fast feeds to the right under high pressure until the burnishing tools 74 come into contact with the shoulder Ax6 of the axle dust collar Ax7.

In position 8, step switch contact 14 opens to deenergize solenoid 6DML, and contact 19 closes to energize solenoid 6CML through the same circuit described above.

De-energizing solenoid 6DML and energizing solenoid 6CML of hydraulic directional valve CM moves the valve to its left hand position to connect line HDL6L to line HDL8L and line HDL7L to line HDL4.

Solenoid 6QML of hydraulic directional valve CFFS remains de-energized, and hydraulic directional valve CFFS therefore remains in its right hand position connecting line HDL1L to line HDL9L and connecting line HDL10L to line HDL4.

The carriage 63 is powered to the right as previously described, that is, oil flows through line HDL1L, valve CFFS, line HDL9L, hydraulic flow control valve CCF, line HDL6L, valve CM, line HDL8L, and into the cap end of cylinder 65. Oil is exhausted from the rod end of the cylinder through line HDL7L, valve CM, and line HDL4 to tank 96.

Burnishing tools 74 continue to bear at high pressure against the axle journal surface through the hydraulic circuit described above, since in position 8, step switch contacts 16 and 17 continue to energize solenoids 6AML and 6EML since they are maintained energized through the same circuit as described above, and solenoid 6GML remains de-energized.

The carriage 63 feeds to the right and releases limit switch 6LSM8L, without immediate effect, and the burnishing tools encounter the shoulder Ax6 between the journal and the dust guard surfaces. The step switch advances and pressure in the carriage cross slide cylinders 71 is gradually reduced, and the tools 74 permitted to climb that shoulder under power from the carriage cylinders 65.

The step switch is advanced to position 9, as its solenoid is energized from line CL2 through the switch interrupter contact 1, the step switch contact 9, which is closed in step switch position 8, limit switch contact 6LSM5L and pressure switch contact 6PS3L to line CL1.

The normally closed contact of limit switch 6LSM5L is closed since that switch is not yet actuated, as is described below.

The normally open contact of electric pressure switch 6PS3L is closed when the pressure builds up in hydraulic line HDL8L with the stalling or engaging of the carriage that occurs as the burnishing tools contact the dust guard shoulder Ax6.

The carriage 63 continues to attempt a fast feed to the right.

Step switch contact 19 continues to energize solenoid 6 CML in position 9 and hydraulic directional valve CM remains in its left hand position.

Solenoid 6QML remains de-energized and the hydraulic directional valve CFFS continues in its right hand position.

The pressure in the cross slide cylinders 71 is reduced and the tool holders permitted to retract.

Step switch contacts 16 and 17 open in position 9 to de-energize solenoids 6AML and 6EML.

De-energized solenoid 6AML permits hydraulic directional valve CSD to be returned by spring pressure to its central position capping lines HDL1L, HDL11L, HDL15L and HDL16L.

De-energized solenoid 6EML allows hydraulic directional valve CST to be returned by spring pressure to its right hand position to cap lines HDL16L, in one of its branches, and HDL17L.

Solenoid 6HML is energized from line CL2 through relay contacts 6T1L, 6T2L, 6T2L and 6ML to line CL4.

The normally open contact of timer relay 6T1L is closed when that relay is energized from line CL2 through limit switch contact 6LSM5L and pressure switch contact 6PS3L to line CL1. The normally closed contact of limit switch 6LSM5L remains closed. Electric pressure switch contact 6PS3L is likewise closed as described just above. Once energized, the relay 6T1L is sealed in from line CL2 through normally open contact 6T1L to line CL4.

The normally closed instantaneous contact of timer relay 6T2L is closed since the circuit which could energize that relay is opened by the normally open delayed closing contact of timer relay 6T1L, which is not yet closed. Normally closed delayed opening contact of timer relay 6T2L likewise remains closed.

The normally closed contact of relay 6ML is closed as that relay is de-energized by the normally open contacts of limit switches 6LSM10L, which are open since the cross slide tool holders 70 are not fully retracted.

Energized solenoid 6HML moves hydraulic directional valve CSPP to its right hand position to connect hydraulic line HDL15L to line HDL4.

The pressure on the cross slide tool holders 70 and 70' therefore decreases since the former oil supply from pump 93 through line HDL1L is blocked at hydraulic directional valve CSD and since the oil maintaining the former pressure in the cap ends of cylinders 71 is allowed to bleed off through lines HDL14L1 and line HDL14L2 to line HDL15L, through hydraulic flow control valve CREL, hydraulic directional valve CSPP and line HDL4 into tank 96.

When the shoulder Ax6 is burnished by the tools climbing over it, the carriage "slows" to a fine feed, the burnishing tool holders 70 partially retract, and the chamfer tools move in.

The carriage slows to fine feed.

Solenoid 6QML is energized from line CL2 through relay contacts 6QML, T5L, 6FL and 6ML to line CL4.

The normally closed instantaneous contact of timer relay T5L is closed as that relay has not yet been energized as is described below.

The normally open contact of relay 6FL is closed as that relay is energized with timer relay 6T2L with which it is connected in parallel.

The normally closed contact of relay 6ML remains closed.

Energized solenoid 6QML shifts hydraulic directional valve CFFS to its left hand position to connect hydraulic line HDL1L to line HDL10L and line HDL9L to line HDL4.

Line HDL6L and the carriage cylinder 65 are therefore powered in fine feed through HDL10L, and hydraulic flow control valve CFF.

The cross slide tool holders retract, slowly.

Solenoid 6BML is energized from line CL2 through relay contacts 6T2L, 6T2L and 6ML to line CL4.

The normally open instantaneous contact of timer relay 6T2L is closed, but the normally closed delayed opening contact is still closed since timer relay 6T2L has just been energized by the closing contact of relay 6T1L which has just been energized as described above.

The normally closed contact of relay 6ML remains closed as described just above.

Energized solenoid 6BML moves hydraulic directional valve CSD to its left hand position to connect hydraulic line HDL1L to line HDL15L and line HDL11L to line HDL16L.

Solenoid 6NML is energized as solenoid 6BML is energized as described above.

Energized solenoid 6NML shifts hydraulic directional valve CBRL to its right hand position to connect hydraulic line HDL1L to hydraulic line HDL21L, and open controllable check valve CK2L, to permit a reverse flow of oil, by pressure maintained through line HDL1L, valve CBRL and line HDL21L.

Solenoid 6GML remains de-energized, and its hydraulic directional valve CSP remains in its right hand position to connect line HDL11L to line HDL13L.

Solenoid 6EML remains de-energized and its hydraulic directional valve CST remains in its right hand position capping line HDL16L.

The cross slide tool holders retract as pump 93 powers oil through line HDL1L, valve CSD, line HDL15L and valve CRDL (described below) to the rod ends of cylinders 71. Oil in the cap ends of those cylinders is exhausted through lines HDL14L1 and HDL14L2 into the cap ends of synchronizing cylinders 77. The pistons 78 of those cylinders synchronously move to exhaust the oil in the rod ends through line HDL13L, valve CK2L, valve CRCL, valve CSP, line HDL11L, valve CSD, line HDL16L and to tank 96, through hydraulic flow control valve CRGL.

The chamfer tool feeds toward the outside edge or corner Ax2 of the axle collar.

Solenoid 6RML is energized from line CL2 through relay contacts 7CL and 6FL to line CL4.

The normally closed contact of relay 7CL is closed since that relay is de-energized by the normally open contact of timer relay 6T4L which is open. That delayed closing contact will not close to energize 7CL until after the delayed closing contact of timer relay 6T2L closes to energize relay 6T4L.

The normally open contact of relay 6FL is closed since that relay was energized with timer relay 6T2L, as described above.

Energized solenoid 6RML shifts hydraulic directional valve CTCS to its right hand position to connect line HDL1L to line HDL18L and line HDL20L to line HDL4.

The operation of the chamfer tool is powered from pump 93 through line HDL1L, valve CTCS, line HDL18L into the cap end of cylinder 85. Piston 86 of that cylinder exhausts the oil from the rod end through line HDL19L, hydraulic flow control valves CTCSCV, line HDL20L, valve CTCS, and line HDL4 to tank 96. The pressure in the chamfer tool hydraulic cylinder may be limited by a hydraulically actuated pressure control valve, such as CRFL.

The cross slide tool holder mounts, which have been slowly retracting, stop.

The normally closed delayed opening contact of timer relay 6T2L opens de-energizing solenoids 6BML and 6NML.

De-energized solenoid 6BML allows valve CSD to return by spring pressure to its central position capping lines HDL1L, HDL11L, HDL15L and HDL16L.

De-energized solenoid 6NML allows valve CBRL to return by spring pressure to its left hand position capping line HDL1L and allowing line HDL21L to exhaust through line HDL4 to tank 96.

Capping line HDL1L at valve CSD prevents the continued powering of the retraction and releasing check valve CK2 by exhausting line HDL21L to tank as described above, causes it to check the flow of oil from cylinders 77 through line HDL13L and thus prevents continued retraction.

After an additional interval, the chamfer tool retracts, the carriage stops, the step switch advances and the cross slide tool holders feed in.

The chamfer tool holder retracts.

Solenoid 6RML is de-energized as the normally closed contact of relay 7CL opens. That relay is energized from line CL2 through timer relay contacts 6T4L and 6T2L to CL1.

Timer relay 6T4L was energized wthen the normally open delayed closing contact of timer relay 6T2L closed, as described just above, and after an interval, the normally open delayed closing contact 6T4L closes.

De-energized solenoid 6RML allows valve CTCS to return by spring pressure to its left hand position to connect line HDL1L to line HDL20L and line HDL18L to line HDL4.

Pump 93 powers oil through line HDL1L, valve CTCS, line HDL20L, hydraulic flow control valve assembly CTCSCV and line HDL19L to the rod end of cylinder 85 to power piston 86 and retract the chamfer tool. Oil is exhausted from the cap end of cylinder 85 through line HDL18L, CTCS and line HDL14L to tank 96.

The carriage stops its interval of fine feed, having been timed to position the burnishing tools opposite to the left hand end portion of the axle dust guard surface Ax7.

Solenoid 6CML is de-energized as the normally closed delayed opening contact of timer relay 6T4L opens.

De-energized solenoid 6CML allows valve CM to return by spring pressure to its central position capping lines HDL6L, HDL7L, HDL8L and HDL4.

Capping line HDL6L stops the oil flow to carriage cylinder 65 which stops the carriage feed.

The step switch is advanced to position 10. The switch solenoid is energized through interrupter contact 1, step switch contact 10, which is closed in position 9, normally open timer relay delayed closing contact 6T4L, closed as just described, and normally open timer relay delayed closing contact 6T2L which remains closed.

The cross slide tool holders 70 feed in under low pressure to contact the dust collar surface Ax7.

Solenoid 6AML is energized from line CL2 through closed relay contact A3 and step switch contact 16, which is closed in step switch position 10, to line CL4.

Energized solenoid 6AML shifts valve CSD to its right hand position to connect line HDL1L to HDL11L and line HDL15L to line HDL16L.

Solenoid 6EML is energized from line CL2 through closed relay contact A3 and step switch contact 17, which is closed in step switch piston 10, to line CL1.

Energized solenoid 6EML shifts valve CST to its left hand position to connect line HDL16L to line HDL4.

Solenoid 6GML is energized from line CL2 through closed relay contact A3, step switch contact 18, which is closed in step switch position 10, to line CL4.

Energized solenoid 6GML shifts valve CSP to its left hand position to connect line HDL11L to line HDL12L and to cap line HDL13L.

The cross slide tool holders are moved toward the dust collar surface and urged against it through the same hydraulic circuitry as previously described.

The carriage 63 fine feeds to the right.

Solenoid CML is energized through limit switch contact 6LSM15L, which remains closed as described above, closed relay contact A3, and step switch contact 19, closed at this time, timer relay contact 6T4L and presser switch contact 6PS1L.

Normally open instantaneous contact of timer relay 6T4L is closed since that relay is energized as previously described.

The normally open contact of electric pressure switch 6PS1L is closed as pressure builds up in line HDL13L when the burnishing tools 74 contact the dust guard surface.

Energized solenoid 6CML shifts valve CM to its left hand position to connect line HDL6L to line HDL3L and line HDL7L to line HDL4.

Solenoid 6QML remains energized through relay contacts 6QML, T5L, 6FL and 6ML.

The normally opened relay contact 6QML is closed since relay QML is energized.

The normally closed contact T5L is closed since its relay has not yet been energized, as described below.

The normally open contact 6FL is closed since its relay remains energized through contact 6T2L to line CL4 as described above.

The normally closed contact of relay 6ML is closed since relay 6ML is de-energized by normally open limit switches 6LSM10L, which are open since the cross slide tool holders 70 are not completely retracted.

Energized solenoid 6QML shifts valve CFFS to its left hand position to connect line HDL1L to line HDL10L and line HDL9L to line HDL4.

Hydraulic pump 93 delivers oil through line HDL1L, valve CFFS, line HDL10L, the fine feed hydraulic flow valve CFF regulator, line HDL6L, valve CM and line HDL8L to the cap end of hydraulic carriage cylinder 65. The piston 66 of that cylinder exhausts the oil from the rod end through line HDL7L, valve CM, and line HDL4 to tank 96.

The carriage which continues to move the burnishing tools across the dust collar surface of the axle in burnishing engagement therewith, contacts and holds actuated limit switch 6LSM5L but without immediate effect, and ultimately the burnishing tools encounter the shoulder Ax8 of the wheel seat surface Ax9.

The step switch advances to position 11, the carriage feed is stopped, and the burnishing tools retract.

The step switch solenoid is energized from line CL2 through interrupter contact 1, step switch contact 11, which is closed in step switch position 10, limit switch contact 6LSM5L and pressure switch contact 6PS3L to line CL1.

The normally open contact of limit switch 6LSM5L has just been closed as the carriage 64 advances towards the center of the lathe as described above.

The normally open contact of electric pressure switch 6PS3L is closed as pressure builds up in hydraulic line HDL8L when the carriage stalls by the tools engaging against the shoulder Ax8 of the wheel seat surface.

The fine feed power to the carriage stops.

Solenoid 6CML is de-energized by step switch contact 19, which is open in the step switch position 11.

De-energized solenoid 6CML allows valve CM to return by spring pressure to its center position to cap lines HDL6L, HDL7L, HDL8L and HDL4. The hydraulic lines to both ends of carriage cylinder 65 are therefore capped, and the carriage held stationary.

The cross slide tool holders retract.

Solenoid 6AML is de-energized by step switch contact 16 which opens in position 11.

Solenoid 6BML is energized from line CL2 through relay contact 9CL, 8CL, A3, and step switch contact 20, which is closed in position 11, to line CL1.

The normally closed contact 9CL is closed as that relay remains de-energized by a normally open delayed closing contact of timer relay 6TL. Relay 6TL remains de-energized by the normally open delayed closing contact of timer relay T5L. Although that relay has just been energized, as will be described below, its delayed closing contact has not yet closed.

Normally closed contact of relay 8CL is closed since that relay likewise remains de-energized by the normally open delayed closing contact of timer relay T5L.

The normally open contact A3 remains closed.

De-energizing solenoid 6AML and energizing solenoid 6BML shifts valve CSD to its left hand position to connect line HDL1L to line HDL15L and line HDL11L to line HDL16L.

Solenoid 6GML is de-energized by step switch contact 18 which opens in step switch position 11.

De-energized solenoid 6GML allows valve CSP to shift by spring pressure to its right hand position to connect line HDL11L to line HDL13L and to cap line HDL12L.

Solenoid 6NML is connected in parallel with solenoid 6BML, and is energized with it as described just above.

Energized solenoid 6NML shifts valve CBRL to its right hand position connecting line HDL1L to line HDL21L.

Pump 93 powers oil to retract the cross slide tool holders 70 through the same hydraulic circuitry as described above.

If the "wheel seat control" or burnishing switch is on, the cross slide tool holders 70 will cease to retract, after an interval, and the carriage will fine feed to the right to position the burnishing tools 74 along the axle's wheel seat surface Ax9. If the "wheel seat control" switch is off, the machine assembly will be controlled as will be subsequently described.

The relay coil of timer T5L was just energized through the wheel seat burnishing switch contact, limit switch contact 6LSM5L, and pressure switch 6PS3L.

The burnishing control switch was on.

The normally open contact of limit switch 6LSM5L was closed as that switch was actuated by the carriage as described above.

The normally open contact of electric pressure switch 6PS3L was closed, as described just above. Once energized, timer relay T5L is sealed in through limit switch contact 6LSM15L, relay contacts T5L and 6ML.

The normally closed contact of limit switch 6LSM15L remains closed as described above, normally open relay contact T5L is closed as just described, and the normally closed contact of relay 6ML remains closed as described above.

The cross slide tool holders stop retracting.

Solenoid 6BML is de-energized as the normally closed contact of relay 8CL opens as that relay is energized through the contacts of relay 9CL and T5L.

The normally closed contact of relay 9CL is closed since that relay remains de-energized by the normally open delayed closing contact of timer relay 6TL, which has not yet closed since timer relay 6TL has just been energized through the normally open delayed closing contact of relay T5L. The normally open delayed closing contact of timer relay T5L closes, the relay having been previously energized as described above. An alternative circuit, which previously energized solenoid 6BML, is opened by the normally closed delayed opening contact of timer relay 6T2L.

De-energized solenoid 6BML allows valve CSD to return by spring pressure to its center position to cap lines HDL1L, HDL11L, HDL15L and HDL16L.

Solenoid 6NML is connected in parallel with solenoid 6BML and de-energized with it.

De-energized solenoid 6NML allows valve CBRL to return to its left hand position to cap line HDL1L and connect line HDL21L to line HDL4 and tank 96.

The cross slide tool holders 70 are therefore held stationary, since the lines from the rod ends of their hydraulic cylinders 71 are capped by valve CSD, and the lines from their cap ends are capped by the check valve CK2.

At the same time the carriage begins a fine feed to the right.

Solenoid 6CML is energized from line CL2 through limit switch contact 6LSM15L and relay contacts A3 and 8CL to line CL4.

The normally closed contact of limit switch 6LSM15L is closed since that switch has not yet been actuated by the carriage as is described below.

The normally open relay contact A3 remains closed.

The normally open contact of relay 8CL is closed since that relay is energized as just described above.

Energized solenoid 6CML shifts valve CM to its left hand position connecting hydraulic line HDL6L to line HDL8L and line HDL7L to line HDL4.

Solenoid 6QML remained energized as previously described until solenoid CML was last de-energized. It is now re-energized through relay contacts 6QML, 8CL, 6FL and 6ML.

The normally open contact of relay 6QML is closed since that relay is energized.

The normally open contact of relay 8CL has just been closed as described above.

The normally open contact of relay 6FL remains closed as before.

The normally closed contact of relay 6ML remains closed as before.

Energized solenoid 6QML shifts valve CFFS to its left hand position connecting line HDL1L to line HDL10L and the fine feed valve CFF and line HDL9L to line HDL4 and tank 96.

Pump 93 powers oil through hydraulic circuitry previously described to move the carriage to the right in fine feed.

After an interval, in which the burnishing tools 74 have been moved to a position along the axle wheel seat surface Ax9, the carriage stops and the cross slide tool holders move in to press the burnishing tools against the axle wheel seat surface under low pressure.

The interval of carriage feed is determined by timer relay 6TL, which was energized through the normally open contact of timer T5L which closed as just described above.

The carriage stops.

Solenoid 6CML is de-energized by the normally open contact of relay 8CL which opens as that relay is de-energized by the opening of the normally closed contact of relay 9CL, when that relay is energized as just described. Step switch contact 19, which is open in step switch position 11, a normally closed delayed opening contact of timer relay 6T4L, and the normally open contact of electric pressure switch 6PS1L each open alternative circuits which might otherwise energize solenoid 6CML.

De-energized solenoid 6CML allows valve CM to return by spring pressure to its central position, capping the line HDL7L and line HDL8L, and thus sealing each end of carriage hydraulic cylinder 65 to hold the carriage stationary.

The cross slide tool holders 70 move in under low pressure.

Solenoid 6AML is energized from line CL2 through relay contacts A3 and 9CL to CL4. Contact A3 remains closed and the normally open contact of relay 9CL has just been closed as described above.

Energized solenoid 6AML shifts valve CSD to its right hand position connecting line HDL1L to line HDL11L and line HDL15L to line HDL16L.

Solenoid 6GML is energized from line CL2 through relay contact A3 and 9CL to line CL4 of a circuit duplicating that which energized solenoid 6AML.

Energized solenoid 6GML shifts valve CSP to the left hand position to connect line HDL11L to line HDL12L and to cap line HDL13L.

Solenoid 6EML remains energized through step switch contact 17, and valve CST remains in its left hand position to connect line HDL16L to line HDL4.

Pump 93 powers oil through line HDL1L and the hydraulic circuitry which has been previously described to power the cross slide tool holders in under low pressure.

When the pressure on the burnishing tools has built up, due to engaging the work, the carriage begins a slow traverse speed feed to the right.

Solenoid 6CML is energized from line CL2 through limit switch contact 6LSM15L, relay contacts A3 and 9CL, and electric pressure switch 6PS1L.

The normally closed contact of limit switch 6LSM15L is closed since the carriage has not yet actuated the switch as is described below.

The contact A3 remains closed.

The normally open contact of relay 9CL is closed as described above.

The normally open contact of electric pressure switch 6PS1L has just been closed as the switch is actuated by the pressure built up in hydraulic line HDL13L which occurs as the burnishing tools encounter the axle wheel seat surface.

Energized solenoid 6CML shifts valve CM to its left hand position to connect line HDL6L to line HDL8L and line HDL7L to line HDL4.

Solenoid 6FML is energized through relay contacts A3 and 9CL and electric pressure switch contact 6PS1L to line CL1. All three contacts are closed as described just above.

Energized solenoid 6FML shifts hydraulic directional valve CT to its left hand position to connect line HDL1L to line HDL6L.

The hydraulic pump 93 powers oil through line HDL1L, valve CT, line HDL6L, valve CM, and line HDL8L to the cap end of hydraulic carriage cylinder 65 to move the carriage at slow traverse speed to the right. Piston 66 exhausts oil in the rod end of the cylinder through line HDL7L, hydraulic flow control valve CRHL (which limits oil flow to slow the traverse speed to the right), valve CM, and line HDL4 to tank 96.

When the burnishing tools 74 have traversed the wheel seat surface of the axle to be burnished, the carriage stops and the cross slide tool holders 70 retract.

The carriage stops.

Relay solenoid 6CML is de-energized as the normally open contact of relay 9CL opens. Relay 9CL is de-energized as the normally open delayed closing contact 6TL opens. Timer relay 6TL is de-energized as the normally open delayed closing contact T5L opens. Timer relay T5L is de-energized as the normally closed contact of limit switch 6LSM15L is opened by the carriage when the burnishing tools are at the right hand side of the portion of the axle wheel seat surface Ax9 to be burnished. The de-energizing of solenoid 6CML is also assured by including in its circuit a normally closed contact of limit switch 6LSM15L.

De-energized solenoid 6CML allows the valve CM to shift by spring pressure to its center position to cap lines HDL7L and HDL8L and thereby to hold the piston 66, and the carriage 63, in a fixed position.

The cross slide tool holders retract.

Solenoid 6AML is de-energized as the normally open contact of relay 9CL opens as described above. An alternative circuit which previously energized relay 6AML is opened by the step switch contact 16, in step switch position 11.

Solenoid 6BML is energized from line CL2 through the contacts of relays 9CL, 8CL, A3, which remains closed, and step switch contact 20, which is closed in step switch position 11, to line CL1.

The normally closed contact of relay 9CL closes as that relay is de-energized, as just described.

The normally closed contact of relay 8CL is closed as that relay is de-energized by the opening of normally open contact of relay T5L.

De-energizing solenoid 6AML and energizing solenoid 6BML shifts hydraulic directional valve CSD to its left hand position to connect line HDL1L to line HDL15L and line HDL11L to line HDL16L.

Solenoid 6GML is de-energized when the normally open contact of relay 9CL opens as just described.

De-energized solenoid 6GML allows valve CSP to shift to its right hand position to connect line HDL11L to line HDL13L, and to cap line HDL12L.

Solenoid 6AML is connected in parallel with solenoid 6BML, and is therefore energized with it, as described above.

Solenoid EML remains energized through the circuit previously described to maintain valve CST in its left hand position in which it connects line HDL16L to line HDL7L.

Solenoid 6HML remains energized from line CL2 through the normally closed limit switch contact 6LSM9L, which remains closed, as explained above, and normally closed relay contact 6CL, which remains closed, as described above.

Hydraulic pump 93 powers oil through line HDL1L, valve CSD and line HDL15L to the rod ends of hydraulic cross slide tool holder cylinders 71. Pistons 72 of those cylinders exhaust oil from the cap ends through lines HDL14L1 and HDL14L2 to the cap ends of synchronizing cylinders 77. Pistons 78 of the synchronizing cylinders exhaust oil from the rod ends through line HDL13L past check valve CK2L, which is opened by pressure maintained in line HDL21L from line HDL1L through valve CBRL, valve CSP, line HDL11L, valve CSD, line HDL16L, valve CST and line HDL4 to tank 96.

The cross slide tool holders 70 fully retract to contact and actuate limit switches 6LSM10L.

If the wheel seat burnishing switch is turned off, the timer T5L will not be energized during the retraction of the cross slide tool holders 70 which follows the burnishing of the axle dust guard surface Ax7 to halt the retraction. Instead, the burnishing tool holders will continue to retract at that time until they contact limit switches 6LSM10L.

Regardless of whether or not the wheel seats have been burnished, when the cross slide tool holders 70 completely retract to contact the limit switches 6LSM10L, the step switch advances, the bleeding of the cap end of the cross slide cylinders is stopped, the synchronizing cylinders are recharged, and the carriage moves at traverse speed to the left.

The step switch advances to position 12. The step switch solenoid is energized through interrupter contact 1, step switch contact 12, which is closed in step switch position 11, and relay contact 6ML.

The normally open contact of relay 6ML is closed as that relay is energized by the normally open contacts of limit switches 6LMS10L, that are held closed by the retracted cross slide tool holders 70 as just described.

The synchronizing cylinders are recharged. Solenoid HML is de-energized when the normally closed contact of relay 6CL opens, as that relay is energized from line CL2 through limit switch contact 6LMS7L, relay contact A3 and step switch contact 14, which is closed in step switch position 12, to line CL1.

The normally closed contact of limit switch 6LSM7L is closed since the limit switch is actuated only when the carriage is in its extreme left hand position, as described above.

The normally open contact of relay A3 remains closed as described before.

De-energized solenoid 6HML allows hydraulic directional valve CSPP to shift to its left hand position to cap line HDL15L, and stop the bleeding of line HDL14L1 and HDL14L2.

In position 12, the step switch continues to energize solenoid 6EML, 6BML and 6NML and solenoid 6GML remains de-energized.

Oil therefor continues to be powered by pump 93 through the circuitry already described to retract the cross slide tool holders, and since they have already fully retracted, pressure builds up in line HDL15L. When a predetermined pressure differential between line HDL15L and line HDL22L is reached, and during the time it continues, hydraulically actuated valve CRDL operates to connect line HDL15L to HDL22L. Oil is powered as before to HDL15L, and continues through valve CRDL, HDL22L into lines HDL14L1 and HDL14L2 and thereby into the cap ends of synchronizing cylinders 77. Oil is exhausted from the rod ends of those cylinders through HDL13L and the circuitry described above into tank 96. The synchronizing cylinders are thereby fully retracted to the appropriate position for the start of the next cycle. This operation insures that oil lost by bleeding the system through line HDL15L, valve CSPP and line HDL4, or by leakage, will be reintroduced to the synchronizing system before the beginning of each cycle. The pressure differential maintained by valve CRDL between lines HDL15L and HDL22L prevents the cross slide tool holders from retracting while the synchronizing cylinders are being recharged, or a check valve CK3L might be incorporated for the same purpose. Such a valve should be held open by pressure in line HDL11L.

The carriage moves at traverse speed to the left.

Solenoid 6DML is connected in parallel with relay 6CL and energized with it as described above.

Energized solenoid 6DML shifts valve CM to its right hand position connecting line HDL6L to line HDL7L and line HDL8L to line HDL4.

Solenoid 6FML is energized from line CL2 through relay contact A3, which remains closed as explained above, step switch contact 15, which is closed in step switch position 12, and limit switch contact 6LSM8L to line CL1.

The normally closed contact of limit switch 6LSM8L is closed since that limit switch is not now actuated by the carriage as explained above.

Energized solenoid 6FML shifts valve CT to its left hand position to connect line HDL1L to line HDL6L.

The hydraulic pump 93 delivers oil through line HDL1L and previously described circuitry to move the carriage at a traverse speed feed to the left.

When the burnishing tools have been generally positioned opposite to the journal portion of the axle, the step switch advances, the recharging of the synchronizing cylinders ceases and the carriage stops.

The step switch advances to position 1. The step switch rotary solenoid is energized from line CL2 through interrupter contact 1, step switch contact 13, which is closed in step switch position 12, and contact or relay CPRL to line CL1.

The normally open contact of relay CPRL closes as that relay is energized when the normally open contact of limit switch 6LSM6L closes as the limit switch is actuated by the carriage 63.

The recharging of the synchronizing cylinders stops as solenoids 6BML and 6NML are de-energized when step switch contact 20 opens as the switch advances to position 1.

De-energized solenoid 6BML allows valve CSD to return by spring pressure to its center position to cap lines HDL1L, HDL11L, HDL15L and HDL16L.

De-energized solenoid 6NML allows valve CBRL to shift to its left hand position, allowing line HDL21L to exhaust to line HDL4 and tank 96.

The cross slide tool holders are thus unpowered and are also held in position, since only one outlet, to the tank 96 through hydraulic flow control valve CREL and the circuitry previously described, remains open.

The carriage stops.

Solenoid 6DML is de-energized by step switch contact 14 which opens in step switch position 1.

De-energized solenoid 6DML allows valve CM to return to its center position by spring pressure to cap lines HDL8L and HDL7L, which feed each end of the carriage hydraulic cylinder 65 to retain piston 66 and the carriage in a fixed position.

Although no immediate mechanical effect results, it may be noted that solenoids 6FML, and 6EML are also de-energized by the advance of the step switch to position 1.

The right hand carriage performs its cycle of operation during approximately the same time that the left hand carriage performs its cycle as just described.

When both carriages have completed the cycle, so that both are positioned along the axle in their start position for the next cycle, the rotation of the spindle and axle stops.

The spindle motor is de-energized when the normally open contacts of the spindle motor relay SM open as that relay is de-energized, by relay contact 6MR or 6ML.

The normally closed contact of relay 6ML opens as that relay is energized by the normally open contacts of limit switches 6LSM10L, which are held closed by the retracted cross slide tool holders 70 as described above.

The normally closed contact of relay 6MR opens as that relay is energized by limit switches 6LSM10R, which are held closed by the retracted cross slide tool holders 70' of the right hand carriage.

An alternative circuit which might have acted to energize solenoid SM is open since the normally open contact of relay 6M7 is open as that relay is de-energized by the normally open contacts of limit switches 6LSM7L and 6LSM7R which are open, as described above, since the carriages 63 and 63' are not in the extreme left and right hand end positions, respectively, of their operational cycles.

The spindle is stopped by a spring powered brake which operates when the brake solenoid "BRAKE" is de-energized by the normally open contacts of relay SM, which open as described above.

After an interval to allow the spindle and axle to come to rest, the right hand head retracts and the left hand center 37 extends to the right to center the axle Ax over the lathe bed axle supports 22.

The right hand center 37' carried by the right hand head $H_2$ retracts to the right.

Relay PR is energized through relay contacts PF, limit switch contact LSM1, relay contacts SST, 6LE, 6ML, 6MR, 6TS, "HOLD," "SIM," and A1.

The normally closed contact of relay PF is closed since that relay is de-energized by the normally open contact of relay 6LE which is open since that relay is de-energized by the normally open contact of trip relay 6E4. Relay 6E4 has been tripped by the closing of the normally open contact of the spindle motor relay SM, which was energized as described above.

The same circuit is also opened by the normally closed contact of relay 6LSR which is open since that relay is energized through limit switch contacts 6LSM18 and 6LSM4. The normally closed contact of limit switch 6LSM18 is closed since the cross head 41 is located to place the left hand center 37 in its normal working position. The normally open contact of limit switch 6LSM4 is closed since pressure is being exerted on leaf spring 57 to maintain the axle in its chucked position.

The normally closed contact of limit switch 6LSM1 is closed, as described above, since the right head $H_2$ is not at the extreme right hand position of its operating cycle.

The delayed closing contact of timer relay SST closes at an interval after that relay is energized through the remaining portion of the above described energizing circuit to the relay PR.

The normally closed contact of relay 6LE is closed since that relay is de-energized as described above.

The normally open contact of relay 6ML and the normally open contact of relay 6MR are both closed, since those relays are energized through limit switches 6LSM10L and 6LSM10R as described above.

The normally open contact of relay 6TS is closed since that relay is energized from line CL1 to line CL2 through the normally open contacts of limit switches 6LSM17L and 6LSM17R which are held closed by the chamfer tool holder mounts 82 and 82' respectively, which are fully retracted as described above.

The normally closed contact of relay "HOLD" is closed if the HOLD switch has not been closed since either the machine "start" switch has been operated, or the "cycle start" switch has been operated, or the cross slide tool holders have started their burnishing cycle as described above.

The energizing circuit to relay "HOLD" is opened by the normally open contact of the hold switch. The holding circuit of that relay is opened by the normally open contact of relay HOLD, which is open since the relay has been de-energized by a normally closed contact of the machine start switch, or a normally closed contact of the cycle start switch, or the normally closed contact of relay 6M7, which opens as that relay is energized through limit switch contacts 6LSM6L and 6LSM7R as described above.

If the hold switch has been depressed in this interval, the cycle halts at this time until it is manually restarted, since relay HOLD will be energized from line CL1 through contacts HOLD, 6M7, "cycle start" and "machine start" to line CL2 and its normally closed contacts are therefore open.

The normally closed contact of the relay SIM is closed since that relay is de-energized by the normally open contact of relay SM, which is open since relay SM has been de-energized as described above.

The normally open contact of relay A1 remains closed as described above.

Energized solenoid PR closes its normally open contacts to energize the adjusting screw motor 52 to retract the right hand head and its center 37'.

At the same time, line CL4 is de-energized by a normally open contact of relay SIM which is de-energized as just described.

Although there is no immediate mechanical result, this de-energizes timer relays 6T1L and 6T2L, and relay 6FL. The normally open delayed closing contact of timer relay 6T2L opens in turn to de-energize timer relay 6T4L.

As the right hand center retracts, the left hand center is extended to maintain pressure upon the axle and hold it firmly in position between the centers 37 and 37'.

Solenoid 6KM is energized through relay contacts 6TS, 6RC and PR.

The normally open contact of relay 6TS is closed as just described.

The normally closed contact of relay 6RC is closed since that relay was tripped through relay contacts A1 and 6LE, and limit switch contacts 6LSM3 and 6LSM2 when axle was chucked between lathe centers. At that time, those contacts were closed, as described above. Since relay 6RC was tripped, it has not been latched since either the normally closed contact of relay PF or the normally closed contact of relay PR or the normally open contact of limit switch 6LSM11, which is actuated by cross head 41 only when the cross head has operated to extend the left hand lathe center to a predetermined position, has been open.

The normally open contact of relay PR is closed as just described.

Energized solenoid 6KM shifts hydraulic directional valve LHC to its left hand position to connect line HDL1L to line HDL2L and line HDL3L to line HDL4.

Pump 93 powers oil through line HDL1L, valve LHC, and line HDL2L into the cap end of the left hand center hydraulic cylinder 43 to power piston 44 and connecting rod 45 to extend the left hand center 37. The piston 44 exhausts the oil in the rod end of cylinder 45 through line HDL3L, valve LHC and line HDL4 to tank 96. Valve LHCR continues to act to limit the pressure in line HDL2L, as described above.

The left hand center continues to extend until it reaches the end of its stroke and stops just before the axle Ax has moved to the right almost far enough to be centered over the lathe bed axle supports 22. The right hand lathe center 37' (and the right hand head H₂) continues to retract to the right, allowing the axle Ax to slide off the lathe centers 37 and 37' and to move slightly to the right off the left hand center 37 as it does so, until it is centered over the lathe bed axle supports 22 and is supported by them.

The right hand head continues to completely retract, and then stops.

Solenoid PR is de-energized as the normally closed contact of limit switch 6LSM1 is opened by the right hand housing 22' when it reaches its extreme right hand position. The normally open contacts of relay PR open to stop the right hand head adjusting screw motor 52.

The left hand center retracts.

Solenoid 6KM is de-energized as another normally open contact of relay PR opens. The same circuit to relay 6KM is also opened as the normally closed contacts of relay 6RC open when that relay is latched and energized through relay contacts PF, PR and limit switch contact 6LSM11.

The normally closed contact of relay PF is closed since that relay remains de-energized as described above.

The normally closed contact of relay PR is closed as that relay is de-energized as just described above.

The normally open contact of limit switch 6LSM11 is held closed since the cross head 41 of the left hand head is extended.

An alternative circuit to solenoid 6KM remains opened by the normally open contact 6LE, as described above.

Solenoid 6LM is energized through another normally open contact of relay 6RC.

De-energizing solenoid 6KM and energizing solenoid 6LM shifts valve LHC to its right hand position to connect line HDL1L to line HDL3L and line HDL2L to line HDL4.

Pump 93 powers oil through HDL1L, valve LHC, and line HDL3L to the rod end of the left hand center hydraulic cylinder 43. Pistons 44 exhaust oil from the cap end of that cylinder through line HDL2L, valve LHC, and line HDL4 to tank 96.

The elevator E again rises.

Solenoid 6JM is energized through limit switch contacts 6LSM12 and 6LSM1 and relay contacts 6US, 6LE and A1 as described at the start.

The normally open contact 6LSM12 is closed since that limit switch is actuated by the left hand head cross slide 41 when the left hand center 37 fully retracts as just described.

Contacts 6LSM1, 6US, 6LE and A1 are closed as described above.

Energized solenoid 6JM shifts valve EV as before, and pump 93' again raises the elevator E slowly past the lower rails R₂.

As the axle saddles 11 pass the ends 89 of the lower rails, abutments 90 engage the saddle pawls 20 and 20' to rock the saddle supports 18 and 18' toward the lower rails 88, this causes the axles to roll onto the lower rails 88.

The axle rolls down the lower rails 88 to be retained by the escapement 91, which may be operated to release axle as desired. For example, they may be directed to subsequent portions of the automated railroad machine shop disclosed and claimed by the Miller et al. application, Serial No. 812,876, filed May 13, 1959.

The elevator continues to rise to the end of its stroke opposite the ends 2 of the upper rails 1.

The cycle continues.

We claim:

1. A machine including the combination of at least one tool, means for supporting said tool and an article having a surface to be worked by this tool, said supporting means permitting relative movements between said tool and surfacing causing this tool to press against and traverse this surface, controllable means for applying variable forces to said tool and surface to cause said movements, and control means for controlling said controllable means and which is actuated automatically by a variation in the pressure between said tool and surface.

2. A machine including the combination of at least one tool, means for supporting said tool and an article having a surface to be worked by this tool, said supporting means permitting relative movements between said tool and surface causing this tool to press against and traverse this surface, controllable means for applying variable forces to said tool and surface to cause said movements, and control means for controlling said controllable means and which is actuated automatically by a variation in the pressure between said tool and surface, said surface having a shoulder and said control means being actuated by an increase in said pressure due to said tool abutting this shoulder while the tool is traversing said surface.

3. A machine including the combination of at least one tool, means for supporting said tool and an article having a surface to be worked by this tool, said supporting means permitting relative movements between said tool and surface causing this tool to press against and traverse this surface, controllable means for applying variable forces to said tool and surface to cause said movements, and control means for controlling said controllable means and which is actuated automatically by a variation in the pressure between said tool and surface, said surface having a shoulder and said control means being actuated by an increase in said pressure due to said tool abutting this shoulder while the tool is traversing said surface and controlling said controllable means so as to reduce the one of said forces causing the tool to press against said surface while maintaining the one of said forces causing the tool to traverse said surface, whereby the tool can ride up and over said shoulder, and said control means including time actuated means for increasing that one of said forces causing said tool to press against said surface at a predetermined time following said force reduction.

4. An automated machine tool combination comprising an elevator for conveying workpieces and movable to up and down positions, a workpiece storage surface extending transversely from said up position and having an end registered therewith, said end having a workpiece escapement actuated by said elevator arriving at said up position and said storage surface having means for urging stored workpieces towards said end, a workpiece delivery conveyor extending transversely from a location between said positions, said elevator having means for unloading a workpiece therefrom to said conveyor and which is actuated by said elevator passing said conveyor while moving upwardly, and a machine tool having means responsive to the arrival of said elevator at said down position for supporting a workpiece free from said elevator and means responsive to operation of this supporting means for causing said machine tool to operate through one operating cycle and freeing said work so it returns to said elevator, and means responsive to said freeing for causing said elevator to move to said up position.

5. An automated machine tool combination comprising an elevator for conveying workpieces and movable to up and down positions, a workpiece storage surface extending transversely from said up position and having an end registered therewith, said end having a workpiece escapement actuated by said elevator arriving at said up position and said storage surface having means for urging stored workpieces towards said end, a workpiece delivery conveyor extending transversely from a location between said positions, said elevator having means for unloading a workpiece therefrom to said conveyor and which is actuated by said elevator passing said conveyor while moving upwardly, and a machine tool having means responsive to the arrival of said elevator at said down position for supporting a workpiece free from said elevator and means responsive to operation of this supporting means for causing said machine tool to operate through one operating cycle and freeing said work so it returns to said elevator, and means responsive to said freeing for causing said elevator to move to said up position, said machine tool including at least one tool, means for mounting said tool for relative movement with respect to a surface of said workpiece supported free from said elevator and causing the tool to press against and traverse said surface, controllable means for applying variable forces to cause said movement, and control means for controlling said controllable means and which is responsive to a variation in the pressure between said tool and surface.

6. An automated machine tool combination comprising an elevator for conveying workpieces and movable to up and down positions, a workpiece storage surface extending transversely from said up position and having an end registered therewith, said end having a workpiece escapement actuated by said elevator arriving at said up position and said storage surface having means for urging stored workpieces towards said end, a workpiece delivery conveyor extending transversely from a location between said positions, said elevator having means for unloading a workpiece therefrom to said conveyer and which is actuated by said elevator passing said conveyor while moving upwardly, and a machine tool having means responsive to the arrival of said elevator at said down position for supporting a workpiece free from said elevator and means responsive to operation of this supporting means for causing said machine tool to operate through one operating cycle and freeing said work so it returns to said elevator, and means responsive to said freeing for causing said elevator to move to said up position, said machine tool including at least one tool, means for mounting said tool for relative movement with respect to a surface of said workpiece supported free from said elevator and causing the tool to press against and traverse said surface, controllable means for applying variable forces to cause said movement, and control means for controlling said controllable means and which is responsive to a variation in the pressure between said tool and surface, said surface having at least one shoulder and said control means being actuated by an increase in said pressure caused by said tool abutting this shoulder while traversing said surface.

7. A railroad axle burnishing lathe comprising opposed spindles for mounting and rotating an axle, burnishing tool mounts sliding transversely with respect to said axle's end parts, and fluid pressure actuated means for sliding said mount transversely towards said end parts and pressing burnishing tools on said mount with a force determined by the fluid pressure supply for said means, said mounts also sliding longitudinally with respect to said axle's end parts and having powered means for sliding them in that direciton, and means for controlling said powered means in response to an increase in the fluid pressure supplied to the first named means.

8. An automated machine tool assembly including workpiece storage and receiving means, a machine tool, and means for transferring workpieces from said storage means to said machine tool and from said tool to said receiving means, and means for preventing operation of said machine tool while said transferring means is operating.

9. An automated machine tool assembly including workpiece storage and receiving means, a machine tool, and means for transferring workpieces from said storage means to said machine tool and from said tool to said receiving means, and means for preventing operation of said machine tool while said transferring means is operating and means for preventing actuation of said transferring means while said machine tool is operating.

10. An automated machine tool assembly including workpiece storage and receiving means, a machine tool, and means for transferring workpieces from said storage means to said machine tool and from said tool to said receiving means, and means responsive to the transferral of a workpiece to said machine by said transferring means for automatically starting said machine tool to operate.

11. An automated machine tool assembly including workpiece storage and receiving means, a machine tool, and means for transferring workpieces from said storage means to said machine tool and from said tool to said receiving means, and means responsive to the transferral of a workpiece to said machine by said transferring means for automatically starting said machine tool to operate, and means for causing said machine tool to operate automatically through a predetermined cycle of operations and to thereafter stop, and means for activating said transferring means automatically after said stop.

12. A burnishing lathe comprising spindles for mounting and rotating a workpiece having at least one surface of circular cross section, a burnishing tool and means for mounting said tool for mutually independent traverse and cross motions relative to said surfaces, fluid powered cross motion means for said tool, a fluid pressure supply, means for connecting said supply to said cross motion means in a direction moving said tool towards said surface so that the pressure of said supply increases upon engagement of said tool with said surface, and traverse motion means responsive to said pressure increase for thereafter traversing said tool relative to said surface.

13. A burnishing lathe comprising spindles for mounting and rotating a workpiece having at least one surface of circular cross section, a burnishing tool and means for mounting said tool for mutually independent traverse and cross motions relative to said surfaces, fluid powered cross motion means for said tool, a fluid pressure supply, means for connecting said supply to said cross motion means in a direction moving said tool towards said surface, so that the pressure of said supply increases upon engagement of said tool with said surface, and traverse motion means responsive to said pressure increase for thereafter traversing said tool relative to said surface, and means for maintaining said supply at a constant pressure during said traverse motion.

14. A burnishing lathe comprising spindles for mounting and rotating a workpiece having at least one surface of circular cross section, a burnishing tool and means for mounting said tool for mutually independent traverse and cross motions relative to said surfaces, fluid powered cross motion means for said tool, a fluid pressure supply, means for connecting said supply to said cross motion means in a direction moving said tool towards said surface so that the pressure of said supply increases upon engagement of said tool with said surface, and traverse motion means responsive to said pressure increase for thereafter traversing said tool relative to said surface, and means responsive to said tool resisting said traverse motion for automatically releasing said fluid pressure connected to said cross motion means.

15. A burnishing lathe comprising spindles for mounting and rotating a workpiece having at least one surface of circular cross section, a burnishing tool and means for mounting said tool for mutually independent traverse and cross motion relative to said surfaces, fluid powered cross motion means for said tool, a fluid pressure supply, means for connecting said supply to said cross motion means in a direction moving said tool towards said surface so that the pressure of said supply increases upon engagement of said tool with said surface, and traverse motion means responsive to said pressure increase for thereafter traversing said tool relative to said surface, and means for maintaining said supply at a constant pressure during said traverse motion, and means responsive to said tool resisting said traverse motion for automatically releasing said fluid pressure connected to said cross motion means.

16. An automatic machine tool including in combination an article having a surface, a tool for working said surface, a carriage and tool holder assembly for holding said tool against said surface and for moving said tool longitudinally along said surface and transversely to and away from said surface a longitudinal hydraulic motor for moving said tool longitudinally along said surface, a transverse hydraulic motor for moving said tool transversely to and away from said surface and for powering said tool against said surface, fluid supply and control means for causing the transverse hydraulic motor to move the tool in to said surface, fluid supply and control means for causing the transverse hydraulic motor to power the tool against said surface with pressure, fluid supply and control means for causing the longitudinal hydraulic motor to move said tool along said surface when said pressure is achieved, and fluid supply and control means for causing the transverse hydraulic motor to maintain said pressure so that the tool will automatically work the surface with a constant and predetermined pressure.

17. An automatic machine tool including in combination an article having a surface, a tool for working said surface, a carriage and tool holder assembly for holding said tool against said surface and for moving said tool longitudinally along said surface and transversely to and away from said surface, a longitudinal hydraulic motor for moving said tool longitudinally along said surface, a transverse hydraulic motor for moving said tool transversely to and away from said surface and for powering said tool against said surface, fluid supply and control causing the transverse hydraulic motor to power said tool against said surface, fluid supply and control means for causing the longitudinal hydraulic motor to move the tool along said surface in one direction until a predetermined value of resistance to movement in that direction is encountered, fluid supply and control means for causing the longitudinal hydraulic cylinder to move said tool along said surface in the other direction when said resistance is encountered, and fluid supply and control means for causing the transverse hydraulic motor to maintain said tool against said surface with pressure for at least a portion of said longitudinal movement along said surface so that the tool will automatically work the surface up to a shoulder and then automatically reverse and work the surface away from that shoulder at a constant and predetermined pressure.

18. An automatic machine tool including in combination an article having a surface, a tool for working said surface, a carriage and tool holder assembly for holding said tool against said surface and for moving said tool longitudinally along said surface and transversely to and away from said surface, a longitudinal and transverse hydraulic motor system for moving said tool longitudinally along said surface and for moving said tool transversely to and away from said surface with pressure, fluid supply and control means for causing the hydraulic motor system to move the tool into and power it against said surface with pressure, fluid supply and control means for causing the hydraulic motor system to move the tool along the surface from the direction of one end of the surface toward the other end of the surface, fluid supply and control means for causing the transverse hydraulic motor to reduce the transverse pressure to allow the tools to be worked back in a direction away from said article by an inclined portion of said surface when the tool encounters a predetermined threshold value of resistance to said movement along the surface all so as to work the surface with the tool at a predetermined transverse pressure until the tool encounters an inclined shoulder and thereby resistance to longitudinal movement whereupon the tool is permitted to be slowly forced away from the article by the inclined shoulder at reduced transverse pressure.

19. An automatic machine tool including in combination an article having a surface, said surface having a raised shoulder, a tool for working said surface, a carriage and tool holder assembly for holding said tool against said surface and for moving said tool longitudinally along said surface and transversely to and away from said surface, a longitudinal and transverse hydraulic motor system for moving said tool longitudinally along said surface and for moving said tool transversely to and away from said surface and for powering said tool against said surface, a fluid supply and control means for causing the hydraulic motor system to move the tool longitudinally along said surface and for causing the hydraulic motor to move the tool away from said surface and into a retracted position when a predetermined resistance to longitudinal motion along said surface has been encountered so that the tool after having worked the surface up to a shoulder will be automatically retracted upon contact with the shoulder.

20. An automatic machine tool including in combination an article having a surface, said surface having a shoulder, a tool for working said surface, a carriage and tool holder assembly for holding said tool against said surface and for moving said tool longitudinally along said surface and transversely to and away from said surface, a longitudinal and transverse hydraulic motor system for moving said tool longitudinally along said surface and for moving said tool transversely to and away from said surface and for powering said tool against said surface, a fluid supply and control means for causing the hydraulic motor system to move the tool longitudinally along said surface and for causing the longitudinal feed pressure to increase when a predetermined resistance to such longitudinal movement is encountered by the tool against the shoulder so as to work the shoulder with the tool under such longitudinal pressure.

References Cited in the file of this patent

UNITED STATES PATENTS

| | | |
|---|---|---|
| 1,370,715 | Teas | Mar. 8, 1921 |
| 1,670,109 | Floeter | May 15, 1928 |

(Other references on following page)

UNITED STATES PATENTS

| | | |
|---|---|---|
| 1,862,516 | Powell | June 7, 1932 |
| 1,919,152 | Wilkins | July 18, 1933 |
| 1,933,226 | Smith | Oct. 31, 1933 |
| 1,936,401 | Lovely | Nov. 21, 1933 |
| 1,945,662 | Smith | Feb. 6, 1934 |
| 1,970,023 | Schroeder | Aug. 14, 1934 |
| 2,029,385 | Perkins | Feb. 4, 1936 |
| 2,139,403 | Cole | Dec. 6, 1938 |
| 2,188,629 | Giesey | Jan. 30, 1940 |
| 2,238,328 | Johnson | Apr. 15, 1941 |
| 2,238,921 | Waldsmith | Apr. 22, 1941 |
| 2,352,726 | Maulding | July 4, 1944 |
| 2,559,360 | Kurzweil | July 3, 1951 |
| 2,714,324 | Dinsmore | Aug. 2, 1955 |
| 2,726,565 | Dodgson | Dec. 3, 1955 |
| 2,782,689 | Carlsen | Feb. 26, 1957 |
| 2,807,974 | Meyer | Oct. 1, 1957 |
| 2,837,000 | Dombrowski | June 3, 1958 |
| 2,915,809 | Egger | Dec. 8, 1959 |
| 2,935,784 | Dombrowski | May 10, 1960 |
| 2,937,552 | Hafensteiner | May 24, 1960 |
| 2,939,352 | Swanson | June 7, 1960 |
| 2,977,669 | Chambers | Apr. 4, 1961 |
| 2,982,004 | Cross | May 2, 1961 |

UNITED STATES PATENT OFFICE
CERTIFICATE OF CORRECTION

Patent No. 3,165,814　　　　　　　　　　　January 19, 1965

William R. Miller et al.

It is hereby certified that error appears in the above numbered patent requiring correction and that the said Letters Patent should read as corrected below.

Column 7, line 27, for "proviously" read -- previously --; column 11, line 24, for "an" read -- any --; column 15, line 34, for "thick" read -- this --; column 16, line 66, for "6MHL" read -- 6HML --; column 26, line 9, for "64" read -- 63 --; column 34, lines 28 and 29, for "application, Serial No. 812,876, filed May 13, 1959" read -- Patent No. 3,085,311, issued April 16, 1963 --.

Signed and sealed this 10th day of August 1965.

(SEAL)
Attest:

ERNEST W. SWIDER
Attesting Officer

EDWARD J. BRENNER
Commissioner of Patents